United States Patent
Brown et al.

(10) Patent No.: US 12,033,494 B2
(45) Date of Patent: Jul. 9, 2024

(54) PROXIMITY-SENSOR SUPPORTING MULTIPLE APPLICATION SERVICES

(71) Applicant: Proxense, LLC, Bend, OR (US)

(72) Inventors: David L. Brown, Chattanooga, TN (US); John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

(21) Appl. No.: 18/150,441

(22) Filed: Jan. 5, 2023

(65) Prior Publication Data

US 2023/0146442 A1 May 11, 2023

Related U.S. Application Data

(63) Continuation of application No. 16/997,590, filed on Aug. 19, 2020, now Pat. No. 11,562,644, which is a continuation of application No. 15/643,734, filed on Jul. 7, 2017, now Pat. No. 10,769,939, which is a continuation of application No. 14/185,877, filed on
(Continued)

(51) Int. Cl.
| | |
|---|---|
| *G08C 17/02* | (2006.01) |
| *G06F 21/32* | (2013.01) |
| *G06F 21/35* | (2013.01) |
| *G06F 21/62* | (2013.01) |

(52) U.S. Cl.
CPC ............ *G08C 17/02* (2013.01); *G06F 21/32* (2013.01); *G06F 21/35* (2013.01); *G06F 21/629* (2013.01); *G06F 2221/2111* (2013.01)

(58) Field of Classification Search
CPC .................................. G06F 21/35; G06F 3/021
See application file for complete search history.

(56) References Cited

U.S. PATENT DOCUMENTS

| | | |
|---|---|---|
| 3,665,313 A | 5/1972 | Trent |
| 3,739,329 A | 6/1973 | Lester |

(Continued)

FOREIGN PATENT DOCUMENTS

| | | |
|---|---|---|
| EP | 1536306 A1 | 6/2005 |
| EP | 2937805 A1 | 10/2015 |

(Continued)

OTHER PUBLICATIONS

Adams, "Designing with 802.15.4 and Zigbee," presented at Industrial Wireless Applications Summit, San Diego, California, Mar. 9, 2004, 22 pgs.

(Continued)

*Primary Examiner* — Curtis J King
(74) *Attorney, Agent, or Firm* — PATENT LAW WORKS LLP

(57) ABSTRACT

A personal digital key (e.g., which can be carried by a human) contains a memory having different service blocks. Each service block is accessible by a corresponding service block access key. As the personal digital key (PDK) moves around, it is detected by sensors. The sensors report position data, thus enabling location tracking of the PDK. The sensors also provide a data path to various applications. An application that has access to a service block access key can therefore access the corresponding service block on the PDK. The sensors themselves may also contain service block access keys.

20 Claims, 9 Drawing Sheets

Related U.S. Application Data

Feb. 20, 2014, now Pat. No. 9,728,080, which is a continuation of application No. 12/268,397, filed on Nov. 10, 2008, now Pat. No. 8,659,427.

(60) Provisional application No. 61/080,916, filed on Jul. 15, 2008, provisional application No. 60/986,939, filed on Nov. 9, 2007.

(56) References Cited

U.S. PATENT DOCUMENTS

| | | | |
|---|---|---|---|
| 3,761,883 A | 9/1973 | Alvarez et al. |
| 3,906,166 A | 9/1975 | Cooper et al. |
| 4,101,873 A | 7/1978 | Anderson et al. |
| 4,430,705 A | 2/1984 | Cannavino et al. |
| 4,476,469 A | 10/1984 | Lander |
| 4,598,272 A | 7/1986 | Cox |
| 4,661,821 A | 4/1987 | Smith |
| 4,759,060 A | 7/1988 | Hayashi et al. |
| 4,814,742 A | 3/1989 | Morita et al. |
| 4,871,997 A | 10/1989 | Adriaenssens et al. |
| 4,993,068 A | 2/1991 | Piosenka et al. |
| 5,043,702 A | 8/1991 | Kuo |
| 5,052,049 A | 9/1991 | Andros et al. |
| 5,187,352 A | 2/1993 | Blair et al. |
| 5,224,164 A | 6/1993 | Elsner |
| 5,296,641 A | 3/1994 | Stelzel |
| 5,307,349 A | 4/1994 | Shloss et al. |
| 5,317,572 A | 5/1994 | Satoh |
| 5,325,285 A | 6/1994 | Araki |
| 5,392,287 A | 2/1995 | Tiedemann et al. |
| 5,392,433 A | 2/1995 | Hammersley et al. |
| 5,410,588 A | 4/1995 | Ito |
| 5,416,780 A | 5/1995 | Patel |
| 5,422,632 A | 6/1995 | Bucholtz et al. |
| 5,428,684 A | 6/1995 | Akiyama et al. |
| 5,450,489 A | 9/1995 | Ostrover et al. |
| 5,473,690 A | 12/1995 | Grimonprez et al. |
| 5,481,265 A | 1/1996 | Russell |
| 5,506,863 A | 4/1996 | Meidan et al. |
| 5,517,502 A | 5/1996 | Bestler et al. |
| 5,541,583 A | 7/1996 | Mandelbaum |
| 5,544,321 A * | 8/1996 | Theimer | H04L 67/62 |
| | | | 380/258 |
| 5,552,776 A | 9/1996 | Wade et al. |
| 5,563,947 A | 10/1996 | Kikinis |
| 5,589,838 A | 12/1996 | McEwan |
| 5,594,227 A * | 1/1997 | Deo | G07F 7/1083 |
| | | | 902/4 |
| 5,598,474 A | 1/1997 | Johnson |
| 5,611,050 A | 3/1997 | Theimer et al. |
| 5,615,277 A | 3/1997 | Hoffman |
| 5,619,251 A | 4/1997 | Kuroiwa et al. |
| 5,623,552 A | 4/1997 | Lane |
| 5,629,980 A | 5/1997 | Stefik et al. |
| 5,644,354 A | 7/1997 | Thompson et al. |
| 5,666,412 A | 9/1997 | Handelman et al. |
| 5,689,529 A | 11/1997 | Johnson |
| 5,692,049 A | 11/1997 | Johnson et al. |
| 5,719,387 A | 2/1998 | Fujioka |
| 5,729,237 A | 3/1998 | Webb |
| 5,760,705 A | 6/1998 | Glessner et al. |
| 5,760,744 A | 6/1998 | Sauer |
| 5,773,954 A | 6/1998 | Vanhorn |
| 5,784,464 A | 7/1998 | Akiyama et al. |
| 5,799,085 A | 8/1998 | Shona |
| 5,821,854 A * | 10/1998 | Dorinski | G06F 21/554 |
| | | | 340/10.5 |
| 5,825,876 A | 10/1998 | Peterson, Jr. |
| 5,835,595 A | 11/1998 | Fraser et al. |
| 5,838,306 A | 11/1998 | O'Connor et al. |
| 5,854,891 A | 12/1998 | Postlewaite et al. |
| 5,857,020 A | 1/1999 | Peterson, Jr. |
| 5,886,634 A | 3/1999 | Muhme |
| 5,892,825 A | 4/1999 | Mages et al. |
| 5,892,900 A | 4/1999 | Ginter et al. |
| 5,894,551 A | 4/1999 | Huggins et al. |
| 5,898,880 A | 4/1999 | Ryu |
| 5,910,776 A | 6/1999 | Black |
| 5,917,913 A | 6/1999 | Wang |
| 5,923,757 A * | 7/1999 | Hocker | G06F 21/35 |
| | | | 345/158 |
| 5,928,327 A | 7/1999 | Wang et al. |
| 5,942,985 A | 8/1999 | Chin |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A | 1/2000 | Mccoy et al. |
| 6,025,780 A | 2/2000 | Bowers et al. |
| 6,035,038 A | 3/2000 | Campinos et al. |
| 6,035,329 A | 3/2000 | Mages et al. |
| 6,038,334 A | 3/2000 | Hamid |
| 6,038,549 A | 3/2000 | Davis et al. |
| 6,038,666 A | 3/2000 | Hsu et al. |
| 6,040,786 A | 3/2000 | Fujioka |
| 6,041,410 A | 3/2000 | Hsu et al. |
| 6,042,006 A | 3/2000 | Van Tilburg et al. |
| 6,045,039 A | 4/2000 | Stinson et al. |
| 6,055,314 A | 4/2000 | Spies et al. |
| 6,068,184 A | 5/2000 | Barnett |
| 6,069,647 A | 5/2000 | Sullivan et al. |
| 6,070,796 A | 6/2000 | Sirbu |
| 6,076,164 A | 6/2000 | Tanaka et al. |
| 6,088,450 A * | 7/2000 | Davis | H04W 12/065 |
| | | | 235/382 |
| 6,088,730 A | 7/2000 | Kato et al. |
| 6,104,290 A | 8/2000 | Naguleswaran |
| 6,104,334 A | 8/2000 | Allport |
| 6,110,041 A | 8/2000 | Walker et al. |
| 6,121,544 A | 9/2000 | Petsinger |
| 6,134,283 A | 10/2000 | Sands et al. |
| 6,137,480 A * | 10/2000 | Shintani | G06F 21/35 |
| | | | 345/169 |
| 6,138,010 A | 10/2000 | Rabe et al. |
| 6,148,142 A | 11/2000 | Anderson |
| 6,148,210 A | 11/2000 | Elwin et al. |
| 6,161,179 A | 12/2000 | Seidel |
| 6,175,921 B1 | 1/2001 | Rosen |
| 6,177,887 B1 | 1/2001 | Jerome |
| 6,185,316 B1 | 2/2001 | Buffam |
| 6,189,105 B1 * | 2/2001 | Lopes | G06F 21/35 |
| | | | 726/20 |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,219,553 B1 | 4/2001 | Panasik |
| 6,237,848 B1 | 5/2001 | Everett |
| 6,240,076 B1 | 5/2001 | Kanerva et al. |
| 6,247,130 B1 | 6/2001 | Fritsch |
| 6,249,869 B1 | 6/2001 | Drupsteen et al. |
| 6,256,737 B1 | 7/2001 | Bianco et al. |
| 6,266,415 B1 | 7/2001 | Campinos et al. |
| 6,270,011 B1 | 8/2001 | Gottfried |
| 6,279,111 B1 | 8/2001 | Jensenworth et al. |
| 6,279,146 B1 | 8/2001 | Evans et al. |
| 6,295,057 B1 | 9/2001 | Rosin et al. |
| 6,307,471 B1 * | 10/2001 | Xydis | G06F 21/35 |
| | | | 340/568.1 |
| 6,325,285 B1 | 12/2001 | Baratelli |
| 6,336,121 B1 | 1/2002 | Lyson et al. |
| 6,336,142 B1 | 1/2002 | Kato et al. |
| 6,343,280 B2 | 1/2002 | Clark |
| 6,345,347 B1 | 2/2002 | Biran |
| 6,363,485 B1 | 3/2002 | Adams et al. |
| 6,367,019 B1 | 4/2002 | Ansell et al. |
| 6,369,693 B1 | 4/2002 | Gibson |
| 6,370,376 B1 | 4/2002 | Sheath |
| 6,381,029 B1 | 4/2002 | Tipirneni |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |

(56) References Cited

U.S. PATENT DOCUMENTS

| | | |
|---|---|---|
| 6,424,249 B1 | 7/2002 | Houvener |
| 6,424,715 B1 | 7/2002 | Saito |
| 6,425,084 B1 | 7/2002 | Rallis et al. |
| 6,434,403 B1 | 8/2002 | Ausems et al. |
| 6,434,535 B1 | 8/2002 | Kupka et al. |
| 6,446,004 B1 | 9/2002 | Cao et al. |
| 6,446,130 B1 | 9/2002 | Grapes |
| 6,456,958 B1* | 9/2002 | Xydis ............... G07C 9/28 702/158 |
| 6,463,534 B1 | 10/2002 | Geiger et al. |
| 6,480,101 B1 | 11/2002 | Kelly et al. |
| 6,480,188 B1 | 11/2002 | Horsley |
| 6,484,182 B1 | 11/2002 | Dunphy et al. |
| 6,484,260 B1 | 11/2002 | Scott et al. |
| 6,484,946 B2 | 11/2002 | Matsumoto et al. |
| 6,487,663 B1 | 11/2002 | Jaisimha et al. |
| 6,490,443 B1 | 12/2002 | Freeny, Jr. |
| 6,510,350 B1 | 1/2003 | Steen et al. |
| 6,522,253 B1 | 2/2003 | Saltus |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,465 B2 | 5/2003 | Frecska |
| 6,563,805 B1 | 5/2003 | Ma et al. |
| 6,564,380 B1 | 5/2003 | Murphy |
| 6,577,238 B1 | 6/2003 | Whitesmith et al. |
| 6,593,887 B2 | 7/2003 | Luk et al. |
| 6,597,680 B1 | 7/2003 | Lindskog et al. |
| 6,607,136 B1 | 8/2003 | Atsmon et al. |
| 6,621,528 B1 | 9/2003 | Kessler et al. |
| 6,624,752 B2 | 9/2003 | Klitsgaard et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,819,219 B1 | 11/2004 | Bolle et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,871,063 B1 | 3/2005 | Schiffer |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,947,003 B2 | 9/2005 | Huor |
| 6,950,941 B1 | 9/2005 | Lee et al. |
| 6,957,086 B2 | 10/2005 | Bahl et al. |
| 6,961,858 B2 | 11/2005 | Fransdonk |
| 6,963,270 B1 | 11/2005 | Gallagher et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowski |
| 6,983,882 B2 | 1/2006 | Cassone |
| 6,999,032 B2 | 2/2006 | Pakray et al. |
| 7,012,503 B2 | 3/2006 | Nielsen |
| 7,020,635 B2 | 3/2006 | Hamilton et al. |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B1 | 6/2006 | Orlando et al. |
| 7,068,623 B1 | 6/2006 | Barany et al. |
| 7,072,900 B2 | 7/2006 | Sweitzer et al. |
| 7,079,079 B2 | 7/2006 | Jo et al. |
| 7,080,049 B2 | 7/2006 | Truitt et al. |
| 7,082,415 B1 | 7/2006 | Robinson et al. |
| 7,090,126 B2 | 8/2006 | Kelly et al. |
| 7,090,128 B2 | 8/2006 | Farley et al. |
| 7,100,053 B1 | 8/2006 | Brown et al. |
| 7,107,455 B1* | 9/2006 | Merkin ............... H04W 12/08 713/185 |
| 7,107,462 B2 | 9/2006 | Fransdonk |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,131,139 B1* | 10/2006 | Meier ............. G06K 19/07762 380/258 |
| 7,137,008 B1 | 11/2006 | Hamid et al. |
| 7,137,012 B1 | 11/2006 | Kamibayashi et al. |
| 7,139,914 B2 | 11/2006 | Arnouse |
| 7,150,045 B2 | 12/2006 | Koelle et al. |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 | 1/2007 | Angelo |
| 7,168,089 B2 | 1/2007 | Nguyen et al. |
| 7,176,797 B2 | 2/2007 | Zai et al. |
| 7,185,363 B1 | 2/2007 | Narin et al. |
| 7,188,110 B1 | 3/2007 | Ludtke et al. |
| 7,191,466 B1 | 3/2007 | Hamid et al. |
| 7,194,438 B2 | 3/2007 | Sovio et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,239,226 B2 | 7/2007 | Berardi et al. |
| 7,239,241 B2* | 7/2007 | Claudatos ............ G07F 9/026 340/572.1 |
| 7,242,923 B2 | 7/2007 | Perera et al. |
| 7,245,221 B2* | 7/2007 | Claudatos ........... G06Q 10/087 705/28 |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito et al. |
| 7,283,650 B1 | 10/2007 | Sharma et al. |
| 7,295,106 B1* | 11/2007 | Jackson ......... G08B 13/19613 340/517 |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle et al. |
| 7,317,799 B2 | 1/2008 | Hammersmith et al. |
| 7,319,395 B2 | 1/2008 | Puzio et al. |
| 7,330,108 B2 | 2/2008 | Thomas |
| 7,333,002 B2 | 2/2008 | Bixler et al. |
| 7,333,615 B1 | 2/2008 | Jarboe et al. |
| 7,336,181 B2 | 2/2008 | Nowak et al. |
| 7,336,182 B1 | 2/2008 | Baranowski et al. |

(56) References Cited

U.S. PATENT DOCUMENTS

| | | |
|---|---|---|
| 7,337,326 B2 | 2/2008 | Palmer et al. |
| 7,341,181 B2 | 3/2008 | Bonalle et al. |
| 7,342,503 B1 | 3/2008 | Light et al. |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 | 4/2008 | Setlak |
| 7,363,494 B2 | 4/2008 | Brainard et al. |
| 7,370,366 B2 | 5/2008 | Lacan et al. |
| 7,378,939 B2 * | 5/2008 | Sengupta ............... H04W 12/06 455/26.1 |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,404,088 B2 | 7/2008 | Giobbi |
| 7,408,799 B1 * | 8/2008 | Kang ..................... G11C 11/22 365/145 |
| 7,424,134 B2 | 9/2008 | Chou |
| 7,437,330 B1 | 10/2008 | Robinson et al. |
| 7,447,911 B2 | 11/2008 | Chou et al. |
| 7,448,087 B2 | 11/2008 | Ohmori et al. |
| 7,458,510 B1 | 12/2008 | Zhou |
| 7,460,836 B2 | 12/2008 | Smith et al. |
| 7,461,444 B2 | 12/2008 | Deaett et al. |
| 7,464,053 B1 | 12/2008 | Pylant |
| 7,464,059 B1 | 12/2008 | Robinson et al. |
| 7,466,232 B2 | 12/2008 | Neuwirth |
| 7,472,280 B2 | 12/2008 | Giobbi |
| 7,477,285 B1 | 1/2009 | Johnson |
| 7,512,806 B2 | 3/2009 | Lemke |
| 7,525,413 B2 | 4/2009 | Jung et al. |
| 7,529,944 B2 | 5/2009 | Hamid |
| 7,533,809 B1 | 5/2009 | Robinson et al. |
| 7,545,312 B2 | 6/2009 | Kiang et al. |
| 7,565,329 B2 | 7/2009 | Lapsley et al. |
| 7,573,382 B2 | 8/2009 | Choubey et al. |
| 7,573,841 B2 | 8/2009 | Lee et al. |
| 7,574,734 B2 | 8/2009 | Fedronic et al. |
| 7,578,442 B2 | 8/2009 | Knowles et al. |
| 7,583,238 B2 | 9/2009 | Cassen et al. |
| 7,583,643 B2 | 9/2009 | Smith et al. |
| 7,587,502 B2 | 9/2009 | Crawford et al. |
| 7,587,611 B2 | 9/2009 | Johnson et al. |
| 7,594,611 B1 | 9/2009 | Arrington, III |
| 7,595,765 B1 | 9/2009 | Hirsch et al. |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,073 B1 | 11/2009 | Robinson et al. |
| 7,624,417 B2 | 11/2009 | Dua |
| 7,640,273 B2 | 12/2009 | Wallmeier et al. |
| 7,644,043 B2 | 1/2010 | Minowa |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,653,883 B2 | 1/2010 | Hotelling et al. |
| 7,676,380 B2 | 3/2010 | Graves et al. |
| 7,689,005 B2 | 3/2010 | Wang et al. |
| 7,701,858 B2 | 4/2010 | Werb et al. |
| 7,706,896 B2 | 4/2010 | Music et al. |
| 7,711,152 B1 | 5/2010 | Davida et al. |
| 7,711,586 B2 | 5/2010 | Aggarwal et al. |
| 7,715,593 B1 | 5/2010 | Adams et al. |
| 7,724,713 B2 | 5/2010 | Del Prado Pavon et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,164 B1 | 7/2010 | Robinson et al. |
| 7,765,181 B2 | 7/2010 | Thomas et al. |
| 7,768,960 B1 | 8/2010 | Barratt |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,865,937 B1 | 1/2011 | White et al. |
| 7,883,003 B2 | 2/2011 | Giobbi et al. |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,049,594 B1 | 11/2011 | Baranowski |
| 8,077,041 B2 | 12/2011 | Stern et al. |
| 8,081,215 B2 | 12/2011 | Kuo et al. |
| 8,082,160 B2 | 12/2011 | Collins et al. |
| 8,089,354 B2 | 1/2012 | Perkins |
| 8,112,066 B2 | 2/2012 | Ben Ayed |
| 8,117,125 B1 | 2/2012 | Kawan et al. |
| 8,125,624 B2 | 2/2012 | Jones et al. |
| 8,135,624 B1 | 3/2012 | Ramalingam et al. |
| 8,171,528 B1 | 5/2012 | Brown |
| 8,193,923 B2 | 6/2012 | Rork et al. |
| 8,200,980 B1 | 6/2012 | Robinson et al. |
| 8,215,552 B1 | 7/2012 | Rambadt |
| 8,219,129 B2 | 7/2012 | Brown et al. |
| 8,248,263 B2 | 8/2012 | Shervey et al. |
| 8,258,942 B1 | 9/2012 | Lanzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,327,151 B2 | 12/2012 | Awatsu et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,387,124 B2 | 2/2013 | Smetters et al. |
| 8,390,456 B2 | 3/2013 | Puleston et al. |
| 8,395,484 B2 | 3/2013 | Fullerton |
| 8,410,906 B1 | 4/2013 | Dacus et al. |
| 8,412,949 B2 | 4/2013 | Giobbi et al. |
| 8,421,606 B2 | 4/2013 | Collins et al. |
| 8,424,079 B2 | 4/2013 | Adams et al. |
| 8,432,262 B2 | 4/2013 | Talty et al. |
| 8,433,919 B2 | 4/2013 | Giobbi et al. |
| 8,448,858 B1 | 5/2013 | Kundu et al. |
| 8,457,672 B2 | 6/2013 | Brown et al. |
| 8,467,969 B2 * | 6/2013 | Nielsen ................. G06Q 10/06 701/540 |
| 8,473,748 B2 | 6/2013 | Sampas |
| 8,484,696 B2 | 7/2013 | Gatto et al. |
| 8,494,576 B1 | 7/2013 | Bye et al. |
| 8,508,336 B2 | 8/2013 | Giobbi et al. |
| 8,511,555 B2 | 8/2013 | Babcock et al. |
| 8,519,823 B2 | 8/2013 | Rinkes |
| 8,522,019 B2 | 8/2013 | Michaelis |
| 8,558,699 B2 | 10/2013 | Butler et al. |
| 8,572,391 B2 | 10/2013 | Golan et al. |
| 8,577,091 B2 | 11/2013 | Ivanov et al. |
| 8,600,674 B1 * | 12/2013 | Barbeau ............... G01C 21/3484 340/995.25 |
| 8,646,042 B1 | 2/2014 | Brown |
| 8,659,427 B2 | 2/2014 | Brown et al. |
| 8,678,273 B2 | 3/2014 | Mcneal |
| 8,717,346 B2 | 5/2014 | Claessen |
| 8,738,925 B1 | 5/2014 | Park et al. |
| 8,799,574 B2 | 8/2014 | Corda |
| 8,838,993 B2 | 9/2014 | Giobbi et al. |
| 8,856,539 B2 | 10/2014 | Weiss |
| 8,857,716 B1 | 10/2014 | Giobbi et al. |
| 8,886,954 B1 | 11/2014 | Giobbi |
| 8,907,861 B2 | 12/2014 | Hirt |
| 8,914,477 B2 | 12/2014 | Gammon |
| 8,918,854 B1 | 12/2014 | Giobbi |
| 8,931,698 B2 | 1/2015 | Ishikawa et al. |
| 8,979,646 B2 | 3/2015 | Moser et al. |
| 9,020,854 B2 | 4/2015 | Giobbi |

(56) References Cited

U.S. PATENT DOCUMENTS

| | | |
|---|---|---|
| 9,037,140 B1 | 5/2015 | Brown |
| 9,042,819 B2 | 5/2015 | Dua |
| 9,049,188 B1 | 6/2015 | Brown |
| 9,113,464 B2 | 8/2015 | Brown et al. |
| 9,165,233 B2 | 10/2015 | Testanero |
| 9,189,788 B1 | 11/2015 | Robinson et al. |
| 9,230,399 B2 | 1/2016 | Yacenda |
| 9,235,700 B1 | 1/2016 | Brown |
| 9,251,326 B2 | 2/2016 | Giobbi et al. |
| 9,251,332 B2 | 2/2016 | Giobbi |
| 9,265,043 B2 | 2/2016 | Brown et al. |
| 9,265,450 B1 | 2/2016 | Giobbi |
| 9,269,221 B2 | 2/2016 | Brown et al. |
| 9,276,914 B2 | 3/2016 | Woodward et al. |
| 9,298,905 B1 | 3/2016 | Giobbi |
| 9,305,312 B2 | 4/2016 | Kountotsis et al. |
| 9,322,974 B1 | 4/2016 | Giobbi |
| 9,405,898 B2 | 8/2016 | Giobbi |
| 9,418,205 B2 | 8/2016 | Giobbi |
| 9,430,624 B1 | 8/2016 | Mortensen et al. |
| 9,450,956 B1 | 9/2016 | Giobbi |
| 9,542,542 B2 | 1/2017 | Giobbi et al. |
| 9,613,483 B2 | 4/2017 | Giobbi |
| 9,679,289 B1 | 6/2017 | Brown |
| 9,728,080 B1 | 8/2017 | Giobbi et al. |
| 9,807,091 B2 | 10/2017 | Giobbi |
| 9,830,504 B2 | 11/2017 | Masood et al. |
| 9,892,250 B2 | 2/2018 | Giobbi |
| 9,898,662 B2 | 2/2018 | Tsuda et al. |
| 9,904,816 B1 | 2/2018 | Giobbi et al. |
| 9,990,628 B2 | 6/2018 | Giobbi |
| 10,026,253 B2 | 7/2018 | Giobbi |
| 10,073,960 B1 | 9/2018 | Brown |
| 10,110,385 B1 | 10/2018 | Rush et al. |
| 10,171,460 B2 | 1/2019 | Giobbi |
| 10,217,339 B1 | 2/2019 | Giobbi |
| 10,229,294 B1 | 3/2019 | Giobbi et al. |
| 10,313,336 B2 | 6/2019 | Giobbi |
| 10,334,541 B1 | 6/2019 | Brown |
| 10,362,483 B2 | 7/2019 | Frusina |
| 10,374,795 B1 | 8/2019 | Giobbi et al. |
| 10,383,112 B2 | 8/2019 | Brown et al. |
| 10,403,128 B2 | 9/2019 | Giobbi et al. |
| 10,437,976 B2 | 10/2019 | Giobbi |
| 10,455,533 B2 | 10/2019 | Brown |
| 10,469,456 B1 | 11/2019 | Giobbi |
| 10,567,965 B2 | 2/2020 | Boettcher et al. |
| 10,698,989 B2 | 6/2020 | Giobbi |
| 10,764,044 B1 | 9/2020 | Giobbi et al. |
| 10,769,939 B2 | 9/2020 | Brown et al. |
| 10,817,964 B2 | 10/2020 | Guillama et al. |
| 10,909,229 B2 | 2/2021 | Giobbi |
| 10,943,471 B1 | 3/2021 | Giobbi et al. |
| 11,086,979 B1 | 8/2021 | Giobbi |
| 11,212,797 B2 | 12/2021 | Brown et al. |
| 11,219,022 B2 | 1/2022 | Brown et al. |
| 11,562,644 B2 | 1/2023 | Brown et al. |
| 2001/0000535 A1 | 4/2001 | Lapsley et al. |
| 2001/0021950 A1* | 9/2001 | Hawley ............... G06F 21/35 707/E17.112 |
| 2001/0024428 A1 | 9/2001 | Onouchi |
| 2001/0026619 A1 | 10/2001 | Howard et al. |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015008 A1 | 2/2002 | Kishida et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson et al. |
| 2002/0023217 A1 | 2/2002 | Wheeler et al. |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0059114 A1 | 5/2002 | Cockrill et al. |
| 2002/0062249 A1 | 5/2002 | Iannacci |
| 2002/0065778 A1 | 5/2002 | Bouet et al. |
| 2002/0068605 A1 | 6/2002 | Stanley |
| 2002/0069364 A1* | 6/2002 | Dosch ............... H04L 63/0869 726/26 |
| 2002/0071559 A1 | 6/2002 | Christensen et al. |
| 2002/0073042 A1 | 6/2002 | Maritzen et al. |
| 2002/0076051 A1 | 6/2002 | Nii |
| 2002/0080969 A1 | 6/2002 | Giobbi |
| 2002/0083178 A1 | 6/2002 | Brothers |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake et al. |
| 2002/0095586 A1 | 7/2002 | Doyle et al. |
| 2002/0095587 A1 | 7/2002 | Doyle et al. |
| 2002/0097876 A1* | 7/2002 | Harrison ............... G06F 21/35 380/270 |
| 2002/0098888 A1 | 7/2002 | Rowe et al. |
| 2002/0100798 A1 | 8/2002 | Farrugia et al. |
| 2002/0103027 A1 | 8/2002 | Rowe et al. |
| 2002/0103881 A1* | 8/2002 | Granade ............... H04L 69/329 709/218 |
| 2002/0104006 A1 | 8/2002 | Boate et al. |
| 2002/0104019 A1 | 8/2002 | Chatani et al. |
| 2002/0105918 A1 | 8/2002 | Yamada et al. |
| 2002/0108049 A1 | 8/2002 | Xu et al. |
| 2002/0109580 A1 | 8/2002 | Shreve et al. |
| 2002/0111919 A1 | 8/2002 | Weller et al. |
| 2002/0112183 A1* | 8/2002 | Baird, III ............... G06F 21/305 726/9 |
| 2002/0116615 A1 | 8/2002 | Nguyen et al. |
| 2002/0124251 A1 | 9/2002 | Hunter et al. |
| 2002/0128017 A1 | 9/2002 | Virtanen |
| 2002/0128057 A1 | 9/2002 | Walker et al. |
| 2002/0129262 A1 | 9/2002 | Kutaragi et al. |
| 2002/0138438 A1 | 9/2002 | Bardwell |
| 2002/0138445 A1 | 9/2002 | Laage et al. |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1 | 10/2002 | Dayley |
| 2002/0143655 A1 | 10/2002 | Elston et al. |
| 2002/0144116 A1 | 10/2002 | Giobbi |
| 2002/0144117 A1 | 10/2002 | Faigle |
| 2002/0147653 A1 | 10/2002 | Shmueli et al. |
| 2002/0148892 A1 | 10/2002 | Bardwell |
| 2002/0150282 A1 | 10/2002 | Kinsella |
| 2002/0152391 A1 | 10/2002 | Willins et al. |
| 2002/0153996 A1 | 10/2002 | Chan et al. |
| 2002/0158121 A1 | 10/2002 | Stanford-Clark |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0184208 A1 | 12/2002 | Kato |
| 2002/0187746 A1 | 12/2002 | Cheng et al. |
| 2002/0191816 A1 | 12/2002 | Maritzen et al. |
| 2002/0196963 A1 | 12/2002 | Bardwell |
| 2002/0199120 A1 | 12/2002 | Schmidt |
| 2003/0001016 A1 | 1/2003 | Fraier et al. |
| 2003/0022701 A1 | 1/2003 | Gupta |
| 2003/0024975 A1 | 2/2003 | Rajasekharan |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046237 A1 | 3/2003 | Uberti |
| 2003/0046552 A1 | 3/2003 | Hamid |

(56) References Cited

U.S. PATENT DOCUMENTS

| | | |
|---|---|---|
| 2003/0048174 A1* | 3/2003 | Stevens .................. G06F 21/35 340/5.64 |
| 2003/0051173 A1 | 3/2003 | Krueger |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0055792 A1 | 3/2003 | Kinoshita et al. |
| 2003/0061172 A1 | 3/2003 | Robinson |
| 2003/0063619 A1 | 4/2003 | Montano et al. |
| 2003/0079133 A1 | 4/2003 | Breiter et al. |
| 2003/0087601 A1* | 5/2003 | Agam .................. H04W 12/06 455/39 |
| 2003/0088441 A1 | 5/2003 | McNerney |
| 2003/0105719 A1 | 6/2003 | Berger et al. |
| 2003/0109274 A1 | 6/2003 | Budka et al. |
| 2003/0115351 A1 | 6/2003 | Giobbi |
| 2003/0115474 A1 | 6/2003 | Khan et al. |
| 2003/0117969 A1 | 6/2003 | Koo et al. |
| 2003/0117980 A1 | 6/2003 | Kim et al. |
| 2003/0120934 A1 | 6/2003 | Ortiz |
| 2003/0127511 A1 | 7/2003 | Kelly et al. |
| 2003/0128866 A1 | 7/2003 | Mcneal |
| 2003/0137404 A1 | 7/2003 | Bonneau et al. |
| 2003/0139190 A1 | 7/2003 | Steelberg et al. |
| 2003/0142041 A1 | 7/2003 | Barlow et al. |
| 2003/0146835 A1 | 8/2003 | Carter |
| 2003/0149744 A1 | 8/2003 | Bierre et al. |
| 2003/0156742 A1 | 8/2003 | Witt et al. |
| 2003/0159040 A1* | 8/2003 | Hashimoto ............. H04L 63/08 713/168 |
| 2003/0163388 A1 | 8/2003 | Beane |
| 2003/0167207 A1 | 9/2003 | Berardi et al. |
| 2003/0169697 A1 | 9/2003 | Suzuki et al. |
| 2003/0172028 A1 | 9/2003 | Abell et al. |
| 2003/0172037 A1 | 9/2003 | Jung et al. |
| 2003/0174839 A1 | 9/2003 | Yamagata et al. |
| 2003/0176218 A1 | 9/2003 | Lemay et al. |
| 2003/0177102 A1 | 9/2003 | Robinson |
| 2003/0186739 A1 | 10/2003 | Paulsen et al. |
| 2003/0187787 A1 | 10/2003 | Freund |
| 2003/0195842 A1 | 10/2003 | Reece |
| 2003/0196084 A1 | 10/2003 | Okereke et al. |
| 2003/0199267 A1* | 10/2003 | Iwasa .................. H04L 63/0853 455/410 |
| 2003/0204526 A1* | 10/2003 | Salehi-Had ........ G07C 9/00182 |
| 2003/0204721 A1 | 10/2003 | Barrus et al. |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1 | 12/2003 | Kwon et al. |
| 2004/0002347 A1 | 1/2004 | Hoctor et al. |
| 2004/0015403 A1 | 1/2004 | Moskowitz et al. |
| 2004/0021552 A1 | 2/2004 | Koo |
| 2004/0022384 A1 | 2/2004 | Flores et al. |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1 | 2/2004 | Ford et al. |
| 2004/0039909 A1 | 2/2004 | Cheng |
| 2004/0044627 A1 | 3/2004 | Russell et al. |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1* | 4/2004 | Scheurich ............. H04W 12/06 713/186 |
| 2004/0068656 A1 | 4/2004 | Lu |
| 2004/0073792 A1 | 4/2004 | Noble et al. |
| 2004/0081127 A1 | 4/2004 | Gardner et al. |
| 2004/0082385 A1 | 4/2004 | Silva et al. |
| 2004/0088558 A1 | 5/2004 | Candelore |
| 2004/0090345 A1 | 5/2004 | Hitt |
| 2004/0098597 A1 | 5/2004 | Giobbi |
| 2004/0103064 A1 | 5/2004 | Howard et al. |
| 2004/0107169 A1 | 6/2004 | Lowe |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher et al. |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0128519 A1 | 7/2004 | Klinger et al. |
| 2004/0129787 A1 | 7/2004 | Saito et al. |
| 2004/0132432 A1* | 7/2004 | Moores ................ G11B 27/034 455/413 |
| 2004/0137912 A1 | 7/2004 | Lin |
| 2004/0153649 A1 | 8/2004 | Rhoads et al. |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0181695 A1* | 9/2004 | Walker ................. H04L 63/08 726/4 |
| 2004/0193925 A1 | 9/2004 | Safriel |
| 2004/0194133 A1 | 9/2004 | Ikeda et al. |
| 2004/0201755 A1 | 10/2004 | Norskog |
| 2004/0203566 A1 | 10/2004 | Leung |
| 2004/0203885 A1* | 10/2004 | Quaid ................. H04W 64/00 455/422.1 |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0230809 A1* | 11/2004 | Lowensohn ........... G06F 21/35 713/186 |
| 2004/0234117 A1 | 11/2004 | Tibor |
| 2004/0243519 A1 | 12/2004 | Perttila et al. |
| 2004/0246103 A1* | 12/2004 | Zukowski ........ G06Q 20/35765 340/10.41 |
| 2004/0246950 A1 | 12/2004 | Parker et al. |
| 2004/0250074 A1* | 12/2004 | Kilian-Kehr ........ H04L 63/0853 713/172 |
| 2004/0252012 A1 | 12/2004 | Beenau et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1 | 12/2004 | Giobbi |
| 2004/0255145 A1 | 12/2004 | Chow |
| 2005/0001028 A1 | 1/2005 | Zuili |
| 2005/0001720 A1* | 1/2005 | Mason .................... G01S 19/17 340/539.2 |
| 2005/0002028 A1 | 1/2005 | Kasapi et al. |
| 2005/0005136 A1 | 1/2005 | Chen et al. |
| 2005/0006452 A1 | 1/2005 | Aupperle et al. |
| 2005/0009517 A1* | 1/2005 | Maes .................. H04W 12/062 455/432.1 |
| 2005/0020322 A1 | 1/2005 | Ruuska et al. |
| 2005/0021369 A1 | 1/2005 | Cohen et al. |
| 2005/0021561 A1 | 1/2005 | Noonan |
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1 | 2/2005 | Shapiro |
| 2005/0040961 A1 | 2/2005 | Tuttle |
| 2005/0040968 A1* | 2/2005 | Damarla ............. G01S 5/02526 455/456.3 |
| 2005/0044372 A1* | 2/2005 | Aull .................... H04L 9/40 713/176 |
| 2005/0044387 A1* | 2/2005 | Ozolins ................ G06F 21/32 713/186 |
| 2005/0047386 A1 | 3/2005 | Yi |
| 2005/0049013 A1 | 3/2005 | Chang et al. |

(56) References Cited

U.S. PATENT DOCUMENTS

| | | |
|---|---|---|
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1 | 4/2005 | Stanko |
| 2005/0076242 A1 | 4/2005 | Breuer |
| 2005/0081040 A1 | 4/2005 | Johnson et al. |
| 2005/0084137 A1 | 4/2005 | Kim et al. |
| 2005/0086115 A1 | 4/2005 | Pearson |
| 2005/0086497 A1 | 4/2005 | Nakayama |
| 2005/0086501 A1 | 4/2005 | Woo et al. |
| 2005/0086515 A1* | 4/2005 | Paris .................. G06F 21/554 726/26 |
| 2005/0089000 A1 | 4/2005 | Bae et al. |
| 2005/0090200 A1 | 4/2005 | Karaoguz et al. |
| 2005/0091338 A1 | 4/2005 | De La Huerga |
| 2005/0091553 A1* | 4/2005 | Chien .................. G06F 21/35 713/324 |
| 2005/0094657 A1 | 5/2005 | Sung et al. |
| 2005/0096053 A1 | 5/2005 | Liu et al. |
| 2005/0097037 A1 | 5/2005 | Tibor |
| 2005/0105600 A1 | 5/2005 | Culum et al. |
| 2005/0105734 A1 | 5/2005 | Buer et al. |
| 2005/0108164 A1 | 5/2005 | Salafia et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1 | 5/2005 | Rodriguez et al. |
| 2005/0114150 A1 | 5/2005 | Franklin |
| 2005/0116020 A1 | 6/2005 | Smolucha et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |
| 2005/0136947 A1 | 6/2005 | Llombart-Juan et al. |
| 2005/0137827 A1 | 6/2005 | Takamiya |
| 2005/0137977 A1 | 6/2005 | Wankmueller |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |
| 2005/0154897 A1 | 7/2005 | Holloway et al. |
| 2005/0161503 A1 | 7/2005 | Remery et al. |
| 2005/0165684 A1 | 7/2005 | Jensen et al. |
| 2005/0166063 A1* | 7/2005 | Huang .................. G06F 21/32 713/186 |
| 2005/0167482 A1 | 8/2005 | Ramachandran et al. |
| 2005/0169292 A1 | 8/2005 | Young |
| 2005/0177716 A1* | 8/2005 | Ginter .................. G06Q 20/04 713/157 |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0192748 A1 | 9/2005 | Andric et al. |
| 2005/0195975 A1 | 9/2005 | Kawakita |
| 2005/0198208 A1 | 9/2005 | Nystrom |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1 | 9/2005 | Ferguson et al. |
| 2005/0210270 A1 | 9/2005 | Rohatgi et al. |
| 2005/0212657 A1 | 9/2005 | Simon |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0218215 A1 | 10/2005 | Lauden |
| 2005/0220046 A1 | 10/2005 | Falck et al. |
| 2005/0221869 A1 | 10/2005 | Liu et al. |
| 2005/0224573 A1 | 10/2005 | Yoshizane et al. |
| 2005/0229007 A1 | 10/2005 | Bolle et al. |
| 2005/0229240 A1 | 10/2005 | Nanba |
| 2005/0231328 A1* | 10/2005 | Castle .............. G06K 19/07309 340/10.5 |
| 2005/0235364 A1 | 10/2005 | Wilson |
| 2005/0242921 A1* | 11/2005 | Zimmerman ............ G07C 9/22 340/5.2 |
| 2005/0243787 A1 | 11/2005 | Hong et al. |
| 2005/0249385 A1 | 11/2005 | Kondo et al. |
| 2005/0251688 A1 | 11/2005 | Nanavati et al. |
| 2005/0253683 A1 | 11/2005 | Lowe |
| 2005/0256878 A1* | 11/2005 | Brown ................ G06F 12/1458 |
| 2005/0257102 A1 | 11/2005 | Moyer et al. |
| 2005/0264416 A1 | 12/2005 | Maurer |
| 2005/0268111 A1* | 12/2005 | Markham .............. G07C 9/257 713/186 |
| 2005/0269401 A1 | 12/2005 | Spitzer et al. |
| 2005/0272403 A1 | 12/2005 | Ryu et al. |
| 2005/0277385 A1 | 12/2005 | Daum |
| 2005/0281215 A1 | 12/2005 | Budampati et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2005/0287985 A1* | 12/2005 | Balfanz .................. G06F 21/33 455/410 |
| 2005/0288015 A1 | 12/2005 | Azizi et al. |
| 2005/0288069 A1 | 12/2005 | Arunan et al. |
| 2005/0289473 A1* | 12/2005 | Gustafson ............ G06F 40/117 715/275 |
| 2006/0001525 A1 | 1/2006 | Nitzan et al. |
| 2006/0009216 A1 | 1/2006 | Welnick et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030279 A1 | 2/2006 | Leabman |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0046664 A1 | 3/2006 | Paradiso et al. |
| 2006/0053234 A1 | 3/2006 | Kumar et al. |
| 2006/0058102 A1 | 3/2006 | Nguyen et al. |
| 2006/0063575 A1 | 3/2006 | Gatto et al. |
| 2006/0064605 A1 | 3/2006 | Giobbi |
| 2006/0066441 A1 | 3/2006 | Knadle et al. |
| 2006/0069814 A1 | 3/2006 | Abraham et al. |
| 2006/0072586 A1 | 4/2006 | Callaway et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0095792 A1 | 5/2006 | Hurtado et al. |
| 2006/0097882 A1* | 5/2006 | Brinkerhoff .......... G08B 21/02 340/573.2 |
| 2006/0097949 A1 | 5/2006 | Luebke et al. |
| 2006/0106645 A1 | 5/2006 | Bergelson et al. |
| 2006/0110012 A1 | 5/2006 | Ritter |
| 2006/0111955 A1 | 5/2006 | Winter et al. |
| 2006/0113381 A1 | 6/2006 | Hochstein et al. |
| 2006/0116935 A1* | 6/2006 | Evans ................ G06Q 30/0601 705/26.62 |
| 2006/0117013 A1 | 6/2006 | Wada |
| 2006/0120287 A1 | 6/2006 | Foti et al. |
| 2006/0129838 A1 | 6/2006 | Chen et al. |
| 2006/0136728 A1 | 6/2006 | Gentry et al. |
| 2006/0136742 A1 | 6/2006 | Giobbi |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | Mcmullen et al. |
| 2006/0163349 A1 | 7/2006 | Neugebauer |
| 2006/0163350 A1 | 7/2006 | Melton et al. |
| 2006/0165060 A1 | 7/2006 | Dua |
| 2006/0169771 A1* | 8/2006 | Brookner .............. G06F 21/6218 235/382 |
| 2006/0170530 A1* | 8/2006 | Nwosu .................. G06F 21/32 340/5.61 |

(56) References Cited

U.S. PATENT DOCUMENTS

| | | |
|---|---|---|
| 2006/0170565 A1 | 8/2006 | Husak et al. |
| 2006/0172700 A1* | 8/2006 | Wu .................. G06F 21/35 |
| | | 455/41.2 |
| 2006/0173846 A1* | 8/2006 | Omae ............... H04L 63/102 |
| | | 707/999.009 |
| 2006/0173991 A1 | 8/2006 | Piikivi |
| 2006/0183426 A1 | 8/2006 | Graves et al. |
| 2006/0183462 A1* | 8/2006 | Kolehmainen .......... H04B 5/00 |
| | | 455/410 |
| 2006/0184531 A1 | 8/2006 | Russlies |
| 2006/0184795 A1 | 8/2006 | Doradla et al. |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0200467 A1* | 9/2006 | Ohmori ............... H04L 63/08 |
| | | 707/999.009 |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0226950 A1* | 10/2006 | Kanou ................. G06F 21/74 |
| | | 713/185 |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |
| 2006/0273176 A1 | 12/2006 | Audebert et al. |
| 2006/0274711 A1 | 12/2006 | Nelson et al. |
| 2006/0279412 A1 | 12/2006 | Holland et al. |
| 2006/0286969 A1 | 12/2006 | Talmor et al. |
| 2006/0288095 A1 | 12/2006 | Torok et al. |
| 2006/0288233 A1* | 12/2006 | Kozlay ................. G07C 9/257 |
| | | 713/186 |
| 2006/0290473 A1 | 12/2006 | Mahasenan et al. |
| 2006/0290580 A1 | 12/2006 | Noro et al. |
| 2006/0292986 A1 | 12/2006 | Bitran et al. |
| 2006/0293925 A1 | 12/2006 | Flom |
| 2006/0294388 A1* | 12/2006 | Abraham .............. H04L 63/08 |
| | | 713/182 |
| 2007/0003111 A1* | 1/2007 | Awatsu ............... G06Q 20/3227 |
| | | 340/5.82 |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0011724 A1 | 1/2007 | Gonzalez et al. |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032225 A1* | 2/2007 | Konicek .............. F24F 11/62 |
| | | 455/417 |
| 2007/0032288 A1 | 2/2007 | Nelson et al. |
| 2007/0033072 A1 | 2/2007 | Bildirici |
| 2007/0033150 A1 | 2/2007 | Nwosu |
| 2007/0036396 A1 | 2/2007 | Sugita et al. |
| 2007/0038751 A1 | 2/2007 | Jorgensen |
| 2007/0043594 A1 | 2/2007 | Lavergne |
| 2007/0050259 A1 | 3/2007 | Wesley |
| 2007/0050398 A1 | 3/2007 | Mochizuki |
| 2007/0050845 A1 | 3/2007 | Das et al. |
| 2007/0051794 A1 | 3/2007 | Glanz et al. |
| 2007/0051798 A1 | 3/2007 | Kawai et al. |
| 2007/0055630 A1 | 3/2007 | Gauthier et al. |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0070040 A1* | 3/2007 | Chen ................... G06F 1/16 |
| | | 345/161 |
| 2007/0072636 A1 | 3/2007 | Worfolk et al. |
| 2007/0073553 A1 | 3/2007 | Flinn et al. |
| 2007/0084523 A1 | 4/2007 | Mclean et al. |
| 2007/0084913 A1 | 4/2007 | Weston |
| 2007/0087682 A1 | 4/2007 | DaCosta |
| 2007/0087834 A1 | 4/2007 | Moser et al. |
| 2007/0094088 A1 | 4/2007 | Mastie et al. |
| 2007/0100507 A1 | 5/2007 | Simon |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0119923 A1 | 5/2007 | Garrison et al. |
| 2007/0120643 A1* | 5/2007 | Lee .................... G06F 21/35 |
| | | 340/5.74 |
| 2007/0120651 A1 | 5/2007 | Kobayashi et al. |
| 2007/0130025 A1 | 6/2007 | Nakajima |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0142032 A1* | 6/2007 | Balsillie ............ H04L 63/083 |
| | | 455/411 |
| 2007/0143626 A1 | 6/2007 | Okuda |
| 2007/0147332 A1 | 6/2007 | Lappetelainen et al. |
| 2007/0152826 A1 | 7/2007 | August et al. |
| 2007/0156850 A1 | 7/2007 | Corrion |
| 2007/0157249 A1* | 7/2007 | Cordray ............... H04N 5/782 |
| | | 348/E7.071 |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0164847 A1* | 7/2007 | Crawford ............. G06F 21/35 |
| | | 340/8.1 |
| 2007/0169121 A1 | 7/2007 | Hunt et al. |
| 2007/0174809 A1 | 7/2007 | Brown et al. |
| 2007/0174868 A1 | 7/2007 | Hitaka |
| 2007/0176756 A1* | 8/2007 | Friedrich ............ G06F 21/78 |
| | | 340/5.74 |
| 2007/0176778 A1* | 8/2007 | Ando ................. G08B 21/22 |
| | | 340/572.1 |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0197261 A1 | 8/2007 | Humbel |
| 2007/0198436 A1 | 8/2007 | Weiss |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0207750 A1 | 9/2007 | Brown et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1 | 10/2007 | Giobbi et al. |
| 2007/0245158 A1 | 10/2007 | Giobbi et al. |
| 2007/0247366 A1 | 10/2007 | Smith et al. |
| 2007/0258626 A1 | 11/2007 | Reiner |
| 2007/0260883 A1 | 11/2007 | Giobbi et al. |
| 2007/0260888 A1 | 11/2007 | Giobbi et al. |
| 2007/0262134 A1 | 11/2007 | Humphrey et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |

(56) References Cited

U.S. PATENT DOCUMENTS

| | | |
|---|---|---|
| 2008/0011842 A1 | 1/2008 | Curry et al. |
| 2008/0012685 A1* | 1/2008 | Friedrich ............... G07F 7/1008 |
| | | 711/170 |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028227 A1* | 1/2008 | Sakurai .................. G06F 21/35 |
| | | 713/182 |
| 2008/0028453 A1 | 1/2008 | Nguyen et al. |
| 2008/0040609 A1 | 2/2008 | Giobbi |
| 2008/0046366 A1 | 2/2008 | Bemmel et al. |
| 2008/0046715 A1 | 2/2008 | Balazs et al. |
| 2008/0049700 A1 | 2/2008 | Shah et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0107089 A1 | 5/2008 | Larsson et al. |
| 2008/0109895 A1* | 5/2008 | Janevski ................ G06F 21/35 |
| | | 726/19 |
| 2008/0111752 A1 | 5/2008 | Lindackers et al. |
| 2008/0127176 A1* | 5/2008 | Lee ....................... G06F 16/958 |
| | | 707/999.001 |
| 2008/0129450 A1 | 6/2008 | Riegebauer |
| 2008/0129463 A1* | 6/2008 | Tuttle ............... G06K 19/07318 |
| | | 340/10.5 |
| 2008/0142588 A1 | 6/2008 | Blum |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1* | 7/2008 | Park ....................... G06F 21/35 |
| | | 340/10.4 |
| 2008/0180213 A1 | 7/2008 | Flax |
| 2008/0186166 A1 | 8/2008 | Zhou et al. |
| 2008/0188308 A1 | 8/2008 | Shepherd et al. |
| 2008/0195863 A1* | 8/2008 | Kennedy ............... G06F 21/445 |
| | | 713/168 |
| 2008/0201768 A1 | 8/2008 | Koo et al. |
| 2008/0203107 A1 | 8/2008 | Conley et al. |
| 2008/0208016 A1 | 8/2008 | Hughes et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0223918 A1 | 9/2008 | Williams et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0246613 A1* | 10/2008 | Linstrom ........... G08B 13/19695 |
| | | 340/572.4 |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0278327 A1* | 11/2008 | Nierenberg ............. G08C 21/00 |
| | | 340/572.1 |
| 2008/0289030 A1 | 11/2008 | Poplett |
| 2008/0289032 A1 | 11/2008 | Aoki et al. |
| 2008/0303637 A1 | 12/2008 | Gelbman et al. |
| 2008/0313728 A1 | 12/2008 | Pandrangi et al. |
| 2008/0314971 A1 | 12/2008 | Faith et al. |
| 2008/0316002 A1 | 12/2008 | Brunet et al. |
| 2008/0316045 A1 | 12/2008 | Sriharto et al. |
| 2009/0002134 A1 | 1/2009 | McAllister |
| 2009/0013191 A1 | 1/2009 | Popowski |
| 2009/0016573 A1 | 1/2009 | McAfee et al. |
| 2009/0024584 A1 | 1/2009 | Dharap et al. |
| 2009/0033464 A1 | 2/2009 | Friedrich |
| 2009/0033485 A1 | 2/2009 | Naeve et al. |
| 2009/0036164 A1 | 2/2009 | Rowley |
| 2009/0040041 A1* | 2/2009 | Janetis ................. G08B 21/0277 |
| | | 340/539.13 |
| 2009/0041309 A1 | 2/2009 | Kim et al. |
| 2009/0045916 A1 | 2/2009 | Nitzan et al. |
| 2009/0052389 A1 | 2/2009 | Qin et al. |
| 2009/0070146 A1 | 3/2009 | Haider et al. |
| 2009/0076849 A1 | 3/2009 | Diller |
| 2009/0081996 A1 | 3/2009 | Duggal et al. |
| 2009/0085724 A1 | 4/2009 | Naressi et al. |
| 2009/0094681 A1 | 4/2009 | Sadler et al. |
| 2009/0096580 A1 | 4/2009 | Paananen |
| 2009/0121890 A1 | 5/2009 | Brown et al. |
| 2009/0125401 A1 | 5/2009 | Beenau et al. |
| 2009/0140045 A1 | 6/2009 | Evans |
| 2009/0157512 A1 | 6/2009 | King |
| 2009/0165123 A1 | 6/2009 | Giobbi |
| 2009/0176566 A1 | 7/2009 | Kelly |
| 2009/0177495 A1 | 7/2009 | Abousy et al. |
| 2009/0195461 A1 | 8/2009 | Hirt |
| 2009/0199206 A1 | 8/2009 | Finkenzeller et al. |
| 2009/0206992 A1 | 8/2009 | Giobbi et al. |
| 2009/0232362 A1 | 9/2009 | Otsubo et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0253516 A1* | 10/2009 | Hartmann ............... G07F 17/32 |
| | | 463/25 |
| 2009/0254448 A1 | 10/2009 | Giobbi |
| 2009/0254971 A1 | 10/2009 | Herz et al. |
| 2009/0264712 A1 | 10/2009 | Baldus et al. |
| 2009/0310514 A1 | 12/2009 | Jeon et al. |
| 2009/0313689 A1 | 12/2009 | Nystroem et al. |
| 2009/0319788 A1 | 12/2009 | Zick et al. |
| 2009/0320118 A1 | 12/2009 | Mueller et al. |
| 2009/0322510 A1 | 12/2009 | Berger et al. |
| 2009/0322566 A1* | 12/2009 | Shirakawa ............. G08G 1/005 |
| | | 340/944 |
| 2009/0328182 A1 | 12/2009 | Malakapalli et al. |
| 2010/0005526 A1* | 1/2010 | Tsuji ....................... G06F 21/84 |
| | | 726/21 |
| 2010/0007498 A1 | 1/2010 | Jackson |
| 2010/0022308 A1* | 1/2010 | Hartmann ............ G07F 17/3293 |
| | | 463/42 |
| 2010/0023074 A1 | 1/2010 | Powers et al. |
| 2010/0037255 A1 | 2/2010 | Sheehan et al. |
| 2010/0062743 A1* | 3/2010 | Jonsson ................. H04W 12/33 |
| | | 455/410 |
| 2010/0077214 A1 | 3/2010 | Jogand-Coulomb et al. |
| 2010/0091987 A1* | 4/2010 | Takahashi ............. H04L 9/3231 |
| | | 380/44 |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0172567 A1 | 7/2010 | Prokoski |
| 2010/0174911 A1 | 7/2010 | Isshiki |
| 2010/0188226 A1 | 7/2010 | Seder et al. |
| 2010/0214100 A1 | 8/2010 | Page |
| 2010/0277283 A1 | 11/2010 | Burkart et al. |
| 2010/0277286 A1 | 11/2010 | Burkart et al. |
| 2010/0291896 A1 | 11/2010 | Corda |
| 2010/0305843 A1 | 12/2010 | Yan et al. |
| 2010/0328033 A1 | 12/2010 | Kamei |
| 2011/0072034 A1 | 3/2011 | Sly et al. |
| 2011/0072132 A1 | 3/2011 | Shafer et al. |
| 2011/0082735 A1 | 4/2011 | Kannan et al. |
| 2011/0085287 A1 | 4/2011 | Ebrom et al. |
| 2011/0091136 A1 | 4/2011 | Danch et al. |
| 2011/0116358 A9 | 5/2011 | Li et al. |
| 2011/0126188 A1 | 5/2011 | Bernstein et al. |
| 2011/0221568 A1 | 9/2011 | Giobbi |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0028609 A1 | 2/2012 | Hruska |
| 2012/0030006 A1 | 2/2012 | Yoder et al. |
| 2012/0069776 A1* | 3/2012 | Caldwell ................. H04W 4/02 |
| | | 370/271 |
| 2012/0086571 A1 | 4/2012 | Scalisi et al. |

(56) References Cited

U.S. PATENT DOCUMENTS

| | | |
|---|---|---|
| 2012/0182123 A1 | 7/2012 | Butler et al. |
| 2012/0212322 A1 | 8/2012 | Idsoee |
| 2012/0226451 A1 | 9/2012 | Bacot et al. |
| 2012/0226565 A1 | 9/2012 | Drozd |
| 2012/0226907 A1 | 9/2012 | Hohberger et al. |
| 2012/0238287 A1* | 9/2012 | Scherzer ............... H04W 72/20 |
| | | 455/422.1 |
| 2012/0278188 A1 | 11/2012 | Attar et al. |
| 2012/0300753 A1 | 11/2012 | Brown et al. |
| 2012/0310720 A1 | 12/2012 | Balsan et al. |
| 2013/0019295 A1 | 1/2013 | Park et al. |
| 2013/0019323 A1 | 1/2013 | Arvidsson et al. |
| 2013/0044111 A1 | 2/2013 | Vangilder et al. |
| 2013/0111543 A1 | 5/2013 | Brown et al. |
| 2013/0135082 A1 | 5/2013 | Xian et al. |
| 2013/0179201 A1 | 7/2013 | Fuerstenberg et al. |
| 2013/0219186 A1 | 8/2013 | Giobbi et al. |
| 2013/0276140 A1 | 10/2013 | Coffing et al. |
| 2013/0277425 A1 | 10/2013 | Sharma et al. |
| 2013/0297514 A1 | 11/2013 | Giobbi |
| 2013/0312082 A1* | 11/2013 | Izu .......................... H04L 63/02 |
| | | 726/13 |
| 2013/0315210 A1 | 11/2013 | Brown et al. |
| 2013/0331063 A1 | 12/2013 | Cormier et al. |
| 2014/0074696 A1 | 3/2014 | Glaser |
| 2014/0147018 A1 | 5/2014 | Argue et al. |
| 2014/0256511 A1 | 9/2014 | Smith |
| 2014/0266604 A1 | 9/2014 | Masood et al. |
| 2014/0266713 A1 | 9/2014 | Sehgal et al. |
| 2014/0337920 A1 | 11/2014 | Giobbi |
| 2015/0026480 A1 | 1/2015 | Giobbi et al. |
| 2015/0039451 A1 | 2/2015 | Bonfiglio |
| 2015/0138330 A1 | 5/2015 | Krishnamoorthi |
| 2015/0294293 A1 | 10/2015 | Signarsson |
| 2015/0310385 A1 | 10/2015 | King et al. |
| 2015/0310440 A1 | 10/2015 | Hynes et al. |
| 2016/0005020 A1 | 1/2016 | Fernando et al. |
| 2016/0093081 A1 | 3/2016 | Kim et al. |
| 2016/0133123 A1 | 5/2016 | Giobbi et al. |
| 2016/0171200 A1 | 6/2016 | Giobbi |
| 2016/0203349 A1 | 7/2016 | Giobbi |
| 2016/0205682 A1 | 7/2016 | Brown et al. |
| 2016/0210614 A1 | 7/2016 | Hall |
| 2016/0300236 A1 | 10/2016 | Wiley et al. |
| 2016/0306956 A1 | 10/2016 | Giobbi |
| 2017/0041315 A1 | 2/2017 | Giobbi |
| 2017/0085564 A1 | 3/2017 | Giobbi et al. |
| 2017/0091548 A1 | 3/2017 | Agrawal et al. |
| 2017/0270738 A1 | 9/2017 | Giobbi |
| 2017/0309165 A1 | 10/2017 | Brown et al. |
| 2017/0353500 A1 | 12/2017 | Jacobsen et al. |
| 2018/0019998 A1 | 1/2018 | Giobbi |
| 2018/0129799 A1 | 5/2018 | Giobbi |
| 2018/0322718 A1 | 11/2018 | Qian et al. |
| 2018/0357475 A1 | 12/2018 | Honda et al. |
| 2019/0065721 A1 | 2/2019 | Giobbi |
| 2019/0172281 A1 | 6/2019 | Einberg et al. |
| 2019/0260724 A1* | 8/2019 | Hefetz .................. H04L 63/107 |
| 2019/0289562 A1 | 9/2019 | Brown |
| 2020/0351873 A1 | 11/2020 | Brown et al. |
| 2021/0219869 A1 | 7/2021 | Ryu et al. |
| 2021/0241592 A1* | 8/2021 | Allen ................. G08B 13/2402 |
| 2022/0210643 A1 | 6/2022 | Hynds et al. |

FOREIGN PATENT DOCUMENTS

| | | |
|---|---|---|
| JP | 10-049604 A | 2/1998 |
| WO | 99/56429 A1 | 11/1999 |
| WO | 00/62505 A1 | 10/2000 |
| WO | 01/22724 A1 | 3/2001 |
| WO | 01/35334 A1 | 5/2001 |
| WO | 01/48714 A1 | 7/2001 |
| WO | 01/75876 A1 | 10/2001 |
| WO | 01/77790 A1 | 10/2001 |
| WO | 2004/010774 A1 | 2/2004 |
| WO | 2004/038563 A2 | 5/2004 |
| WO | 2005/031663 A2 | 4/2005 |
| WO | 2005/050450 A1 | 6/2005 |
| WO | 2005/086802 A2 | 9/2005 |
| WO | 2007/087558 A2 | 8/2007 |

OTHER PUBLICATIONS

Adams, "Meet the ZigBee Standard," Sensors Online, Jun. 2003, 7 pgs., archived at https://web.archive.org/web/20031008191032/http:/sensorsmag.com/articles/0603/14/pf_main.shtml.

Adams, "Zigbee vital in industrial applications," EE Times, Jul. 29, 2003, 3 pgs., archived at https://web.archive.org/web/20031013062940/http:/www.eetimes.com/story/OEG20030727S0002.

Agourare et al., "Authentication and location control via RFID analysis, "2009 IEEE Conference on Emerging Technologies & Factory Automation, Sep. 1, 2009, 8 pgs.

Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8cO on Jan. 7, 2007, 5 pgs.

Anonymous, "Firecrest Shows How Truly Commercially-Minded Companies Will Exploit the Internet," Computergram International, Jan. 18, 1996, 2 pgs.

Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.

Antonoff, "Visiting Video Valley," Sound & Vision, Nov. 2001, pp. 116, 118-119.

Apple et al., "Smart Card Setup Guide," 2006, downloaded from http:/manuals.info.apple.com/en_US/Smart_Card_Setup_Guide.pdf on or before May 3, 2012, 16 pgs.

Balanis, "Antenna Theory: A Review," Jan. 1992, Proceedings of the IEEE, vol. 80, No. 1, p. 13.

Beaufour, "Personal Servers as Digital Keys," Proceedings of the Second IEEE Annual Conference on Pervasive Computing and Communications (PERCOM'04), Mar. 14-17, 2004, pp. 319-328.

Biopay, LLC, "Frequently Asked Questions (FAQs) About BioPay," retrieved from http://www.biopay.com/faqs-lowes.asp on Jan. 7, 2007, 5 pgs.

Blip Systems, "Mar. 8, 2004—Bluetooth at the office?" at least as early as Oct. 11, 2004, archived at https://web.archive.org/web/20041011094320/http:/www.blipsystems.com/Default.asp?ID=16&M=News&PID=25&NewsID=9.

Blip Systems, "BlipManager," at least as early as May 17, 2004, 1 pg., archived at https://web.archive.org/web/20040517050728/http:/www.blipsystems.com/Default.asp?ID=11.

Blip Systems, "BlipMobility," at least as early as Apr. 7, 2004, archived at https://web.archive.org/web/20040407212934/http:/www.blipsystems.com/Default.asp?ID=118.

Blip Systems, "BlipNet API," at least as early as May 18, 2004, 1 pg., archived at https://web.archive.org/web/20040518060132/http:/www.blipsystems.com/Default.asp?ID=92.

Blip Systems, "BlipNet Explore a wireless world . . . of great opportunities," brochure available Sep. 2002, 6 pgs., availabe online at https://web.archive.org/web/20031012184406/http:/www.blipsystems.com/products_blipnet.shtml.

Blip Systems, "BlipNet Technical Overview," Mar. 2003, 30 pgs., archived at https://web.archive.org/web/20031012184406/http:/www.blipsystems.com/products_blipnet.shtml.

Blip Systems, "BlipNode," at least as early as May 16, 2004, 1 pg., archived at https://web.archive.org/web/20040516001554/http:/www.blipsystems.com/Default.asp?ID=10.

Blip Systems, "BlipServer," at least as early as May 17, 2004, 1 pg., archived at https://web.archive.org/web/20040517044955/http:/www.blipsystems.com/Default.asp?ID=9.

Blip Systems, "Bluetooth Networks: Products: Bluetooth infracture," product description, at least as early as Oct. 2003, archived at https://web.archive.org/web/20031012184406/http:/www.blipsystems.com/products_blipnet.shtml.

(56) References Cited

OTHER PUBLICATIONS

Blip Systems, "Product Information—BlipNet—Presentation of BlipNet 1.0—A Bluetooth Access System," Aug. 2002, 2 pgs., archived at https://web.archive.org/web/20031012184406/http:/www.blipsystems.com/products_blipnet.shtml.
Blueproximity, "BlueProximity—Leave it—it's locked, come back, it's back too . . . " Aug. 26, 2007, retrieved from http://blueproximity.sourceforge.net/viahttp://www.archive.org/ on or before Oct. 11, 2011, 1 pg.
Bluetooth Sig, Inc. "Specification of the Bluetooth System," Version 1.2, Nov. 5, 2003, 82 pgs., archived at https://web.archive.org/web/20031119092849/http:/www.bluetooth.com/dev/spec.v12.asp.
Bluetooth Sig, Inc., "Bluetooth," www.bluetooth.com, Jun. 1, 2000, 8 pgs.
Bluetooth Sig, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http:/salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Callaway, "Wireless Sensor Networks: Architectures and Protocols," book description, Motorola Labs, Auerbach Publications, Aug. 26, 2003, 3 pgs., archived at https://web.archive.org/web/20031023101953/http:/www.crcpress.com/shopping_cart/products/product_detail.asp?sku=AU1823.
Callaway, Wireless Sensor Networks: Architectures and Protocols, Jan. 1, 2004, Auerbach Publications, 366 pgs.
Chen et al."On Enhancing Biometric Authentication with Data Protection." KES2000. Fourth International Conference on Knowledge-Based Intelligent Engineering Systems and Allied Technologies. Proceedings (Cat. No. 00TH8516), vol. 1, Aug. 1, 2000, pp. 249-252.
Chi et al., "Industrial Wireless Sensor Networking: A Market Dynamics Study," ON World, Jun. 28, 2004, 5 pgs., archived at https://web.archive.org/web/20040710182216/http:/onworld.com:80/html/industrialwirelesssensor.htm.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (POE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance," Journal of Information Systems, vol. 31, No. 3, Fall 2017, pp. 5-21.
David et al., Security Issues for Contactless Smart Cards, Sep. 1, 1997, conference paper, available online at https://link.springer.com/chapter/10.1007/BFb0054029, 6 pgs.
Debow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Disclosed Anonymously (Method and Apparatus for Mobile Identity Authentication)., An IP.com Prior Art Database Technical IP.com No. IPCOM000194545D., IP.com Electronic Publication Date: Mar. 29, 2010 (Year: 2010).
Duflot et al., "A Formal Analysis of Bluetooth Device Discovery," presented at the 1st International Symposium on Leveraging Applications of Formal Methods (ISOLA'04), Oct. 30-Nov. 2, 2004, Paphos, Cyprus, and published in the International Journal on Software Tools for Technology Transfer 8, pp. 621-632, 16 pgs., https://doi.org/10.1007/s10009-006-0014-x.
Dvorak, IEEE 802.15.4 and Zigbee Overview, Sep. 27, 2005, Motorola, 26 pgs.
Eshed, "Bluetooth Wireless Technology Application for the Retail Market," published at www.tadlys.com on May 2001, 8 pgs.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Freescale Semicondutor, Inc., "Freescale Events," see ZigBee Open House Event, Aug. 18, 2004, 6 pgs., archived at https://web.archive.org/web/20040909082726/https://www.freescale.com/webapp/sps/site/overview.jsp?nodeld=02XPgQ7JgbBqJQ#zigbee_openhouse_04.
Freescale Semiconductor, Inc., "Overview," ZigBee General Information, at least as early as Aug. 17, 2004, 1 pg., archived at https://web.archive.org/web/20040817210006/http:/www.freescale.com/webapp/sps/site/overview.jsp?nodeId=02XPgQhHPRjdyB37087725.
MIT Computer Science and Artificial Intelligence Laboratory, "Cricket v2 User Manual," Cricket Project, MIT Computer Science and Artificial Intelligence Lab, Cambridge, MA, Jan. 2005, 57 pgs., available online at https://web.archive.org/web/20041206144922/http:/cricket.csail.mit.edu/v2man.html.
MIT Computer Science and Artificial Intelligence Laboratory, "The Cricket Indoor Location System," at least as early as Nov. 19, 2004, 6 pgs., archived at https://web.archive.org/web/20041119183049/http://cricket.csail.mit.edu/.
Motorola, Inc., "Motorola First to Demonstrate ZigBee 2.4 GHz Wireless Networking Technology," press release, Mar. 27, 2003, 2 pgs., archived at https://web.archive.org/web/20050205053308/http://www.motorola.com/mediacenter/news/detail/0, 1958,2743_2228_23,00.html.
Muller, "Desktop Encyclopedia of the Internet," 1999, Artech House Inc., Norwood, MA, all pages.
National Criminal Justice Reference Service, "Antenna Types," Dec. 11, 2006, online at http://ncjrs.gov/pdfffiles1/nij/185030b.pdf, retrieved from http://web.archive.erg/web/*/http://www.ncjrs.gov/pdffiles1/nij/185030b.pdf on Jan. 12, 2011, 1 pg.
Nel et al., "Generation of Keys for use with the Digital Signature Standard (DSS)," Communications and Signal Processing, Proceedings of the 1993 IEEE South African Symposium, Aug. 6, 1993, pp. 6-11.
Nerd Vitiles, "magicJack: Could It Be the Asterisk Killer?" Aug. 1, 2007, retrieved from http://nerdvittles.com/index.php?p=187 on or before Oct. 11, 2011, 2 pgs.
Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.
Noore, "Highly Robust Biometric Smart Card Design." IEEE Transactions on Consumer Electronics, vol. 46, No. 4, Nov. 2000, pp. 1059-1063.
Paget, "The Security Behind Secure Extranets," Enterprise Systems Journal, vol. 14, No. 12, Dec. 1999, 4 pgs.
Pash, "Automate proximity and location-based computer actions," Jun. 5, 2007, retrieved from http://lifehacker.com/265822/automate-proximity-and-location+based-computer-actionson or before Oct. 11, 2011, 3 pgs.
Petition for Inter Partes Review of U.S. Pat. No. 10,698,989, Aug. 26, 2021, 3356 pgs.
Petition for Inter Partes Review of U.S. Pat. No. 8,352,730, Aug. 26, 2021, 2450 pgs.
Petition for Inter Partes Review of U.S. Pat. No. 9,049,188, Aug. 26, 2021, 800 pgs.
Petition for Inter Partes Review of U.S. Pat. No. 9,235,700, Aug. 26, 2021, 466 pgs.
Petition for Inter Partes Review of U.S. Pat. No. 9,298,905, Aug. 26, 2021, 1941 pgs.
Pope et al., "Oasis Digital Signature Services: Digital Signing without the Headaches," IEEE Internet Computing, vol. 10, Sep./Oct. 2006, pp. 81-84.

(56) References Cited

OTHER PUBLICATIONS

Priyantha, "The Cricket Indoor Location System," Ph.D. thesis submitted to Department of Electrical Engineering and Computer Science, Massachusetts Institute of Technology, Jun. 2005, 199 pgs.
Request for Ex Parte Reexamination of U.S. Pat. No. 10,698,989, Jun. 8, 2022, 1505 pgs.
Request for Ex Parte Reexamination of U.S. Pat. No. 8,352,730, Jun. 8, 2022, 1401 pgs.
Request for Ex Parte Reexamination of U.S. Pat. No. 9,298,905, Jun. 8, 2022, 1123 pgs.
Rodriguez et al., "In-building location using Bluetooth," Proceedings of the International Workshop on Wireless Ad-Hoc Networks (IWWAN 2005), May 23-26, 2005, London, England, 7 pgs.
Saflink Corporation, "SAFModule (Trademark): A Look Into Strong Authentication," white paper, retrieved from www.ibia.org/membersadmin/whilepapers/pdf/6/SAFmod_WP.pdf on Jan. 7, 2007, 8 pgs.
Sapsford, "E-Business: Sound Waves Could Help Ease Web-Fraud Woes," Wall Street Journal, Aug. 14, 2000, p. B1.
Schneier, Applied Cryptography, Second Edition: Protocols, Algorithms, and Source Doe in C, Jan. 1, 1996, John Wiley & Sons, Inc., 1027 pgs.
Serrao et al., "Protecting Digital Music Delivery and Consumption using the OCCAMM Project Framework," Proceedings of the Second International Conference on Web Delivering of Music, 2002, pp. 38-45, doi: 10.1109/WDM.2002.1176192.
Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.
Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.
Smart Card Alliance, "Contactless Technology for Secure Physical Access: Technology and Standards Choices," Smart Card Alliance, Oct. 2002, pp. 1-48.
Smart Card Alliance, "Smart Cards and Biometrics White Paper: Smart Card Alliance," May 2002, retrieved from http://www.securitymanagement.com/library/smartcard faqtech0802.pdf on Jan. 7, 2007, 7 pgs.
Smart Card Alliance, Contactless Payment and the Retail Point of Sale: Applications, Technologies and Transaction Models, Mar. 1, 2003, a Smart Card Alliance Report, 50 pgs.
Smart Card Alliance, Smart Card Alliance—The Alliance, Jan. 22, 2001, http://www.smartcardalliance.org, 1 pg.
Srivastava, "Is internet security a major issue with respect to the slow acceptance rate of digital signatures," Jan. 2, 2005, Computer Law & Security Report, pp. 392-404.
Tadlys Ltd., "'Hotspot' Gaming Arcade," at least as early as Dec. 9, 2004, 2 pgs., archived at https://web.archive.org/web/20041209234518/http://www.tadlys.com/media/downloads/Tadlys_gaming_arcade.pdf.
Tadlys Ltd., "About Tadlys," at least as early as Apr. 5, 2001, 1 pg., archived at https://web.archive.org/web/20010405044249/http:/www.tadlys.com/about.html.
Tadlys Ltd., "An Advertisers' Dream—From direct marketing to sales," Nov. 2004, 2 pgs., archived at https://web.archive.org/web/20041101092944/http://www.tadlys.com/media/downloads/m-commerce_app.pdf.
Tadlys Ltd., "Bluetooth Glossary," at least as early as Jun. 2004, 12 pgs., archived at https://web.archive.org/web/20040531082349/http://www.tadlys.com/pages/Downloads_content.asp?intGlobalId=1.
Tadlys Ltd., "First Demo of Distribution and Redemption of e-Coupons over Bluetooth," Tadlys Company News and Events, Jun. 5, 2001, 1 pg., archived at https://web.archive.org/web/20040601051516/http://tadlys.com/Pages/news_content.asp?iGlobalID=17.
Tadlys Ltd., "Operator Systems," at least as early as Nov. 1, 2004, 2 pgs., archived at https://web.archive.org/web/20041101101402/http://www.tadlys.com/media/downloads/operator_network.pdf.
Tadlys Ltd., "Tadlys Announces Range of Bluetooth Access Network Solutions," Tadlys Company News and Events, Jan. 22, 2001, 1 pg., archived at https://web.archive.org/web/20040624122319/http://www.tadlys.com/Pages/news_content.asp?iGlobalID=16.
Tadlys Ltd., "Tadlys' Wire free networking solutions," Feb. 2001, 2 pgs., archived at https://web.archive.org/web/20010204012700/http:/www.tadlys.com/solutions.html.
Tadlys Ltd., "Wireless hospital network," at least as early as Jul. 1, 2004, 2 pgs., archived at https://web.archive.org/web/20040701105046/http://www.tadlys.com/media/downloads/tadlys_hospital_wireless_network.pdf.
Tadlys Ltd., "Wireless Museum Information," at least as early as Dec. 12, 2005, 2 pgs., archived at https://web.archive.org/web/20051212162456/http://www.tadlys.com/media/downloads/Tadlys_wireless_museum_network.pdf.
Tadlys Ltd., "Corporate Systems," at least as early as Nov. 1, 2004, 2 pgs., archived at https://web.archive.org/web/20041101095441/http://www.tadlys.com/media/downloads/Corporate_network.pdf.
Thomson Multimedia, "Thomson multimedia unveils copy protection proposal designed to provide additional layer of digital content security," retrieved from www.thompson-multimedia.com/gb/06/c01/010530.htm on Mar. 4, 2002, May 30, 2001, 2 pgs.
Thongthammachart et al., "Bluetooth Enables In-door Mobile Location Services," Proceedings of the 57th IEEE Semiannual Vehicular Technology Conference, Apr. 22-25, 2003, 5 pgs.
University of Birmingham, "PRISM: Probabilistic Symbolic Model Checker," at least as early as Aug. 3, 2004, 3 pgs., archived at https://web.archive.org/web/20040803193058/http://www.cs.bham.ac.uk/~dxp/prism/casestudies/index.html.
Unixhelp, "What is a file?" Apr. 30, 1998, retrieved from unixhelp.ed.ac.uk/editors/whatisafile.html accessed Mar. 11, 2010 via http://waybackmachine.org/19980615000000*/http://unixhelp.ed.ac.uk/editors/whatisafile.html on Mar. 11, 2011, 1 pg.
Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
Weissman, "Indoor Location," Tadlys Ltd. white paper, at least as early as Oct. 31, 2004, 15 pgs., archived at https://web.archive.org/web/20041031125859/http:/www.tadlys.com/media/downloads/Indoors_Location_Systems.pdf.
White, "How computers Work," Millennium Edition, 1999, Que Corporation, Indianapolis, IN, all pages.
Yoshida, "Content Protection Plan Targets Wireless Home Networks," EE Times, Jan. 11, 2002, retrieved from www.eetimes.com/story/OEG20020111S0060 on Mar. 4, 2002, 2 pgs.
Zhang et al., "A User-Centric M-Payment Solution," The ISG-Smart Card Centre and the Information Security Group, Royal Holloway, University of London, Egham, Surrey, TW20 0EX, UK, 2005, 8 pgs.
ZigBee Alliance, "Welcome to the ZigBeeTM Alliance," exemplary web page, at least as early as Sep. 24, 2004, 2 pgs., archived at https://web.archive.org/web/20040924045517/http://zigbee.org/.
ZigBee Alliance, "ZigBee Specification," ZigBee Document 053474r06, Version 1.0, Dec. 14, 2004, 378 pgs.
ZigBee Alliance, "The ZigBeeTM Buzz Is Growing: New Low-Power Wireless Standard Opens Powerful Possibilities," Electronic Design, Jan. 12, 2004, 12 pgs., archived at https://web.archive.org/web/20040411172015/http:/www.elecdesign.com/Files/29/7186/7186_01.pdf.
ZigBee Alliance, "ZigBeeTM Positioned to Drive Wireless Networking in Building Automation, Industrial and Residential Control and Sensors Markets in 2004," press release, Feb. 17, 2004, 3 pgs.,

(56) References Cited

OTHER PUBLICATIONS archived at https://web.archive.org/web/20040423220244/http://www.zigbee.org/documents/04036r5ZB_MWG-Momentum-Release_FINAL.pdf.
Freescale Semiconductor, Inc., "ZigBeeTM," Freescale Semiconductor Wireless Standards, at least as early as Aug. 18, 2004, 2 pgs., archived at https://web.archive.org/web/20040818075046/http://www.freescale.com/webapp/sps/site/overview.jsp?nodeId=02XPgQhHPRjdyB.
Freescale Semiconductor, Inc., "ZigBeeTM," Freescale Semiconductor Wireless Standards, at least as early as Jun. 11, 2004, 2 pgs., archived at https://web.archive.org/web/20040611051834/http://e-www.motorola.com/webapp/sps/site/overview.jsp?nodeId=02XPgQhHPRjdyB.
Freescale Semiconductor, Inc., "Freescale's ZigBeeTM-ready Platform Wins Sensors Magazine Best of Sensors Expo Award," Freescale Semiconductor Wireless, at least as early as Aug. 17, 2004, 1 pg., archived at https://web.archive.org/web/20040817203409mp_/http://www.freescale.com/webapp/sps/site/overview.jsp?nodeId=02XPgQ6988.
Freescale Semiconductor, Inc., "ZigBee Alliance Successfully Concludes First Multi-node Network Test," press release, Jul. 6, 2004, 2 pgs., archived at https://web.archive.org/web/20040717113733/http://www.zigbee.org/documents/First-Multi-Node_Testing_FINAL_000.pdf.
Freescale Semiconductor, Inc., "ZigBeeTM Technology from Freescale," Freescale Semiconductor, Inc. white paper, 2004, 4 pgs., archived at https://web.archive.org/web/20050513024652/http://www.freescale.com/files/wireless_comm/doc/brochure/BRZIGBEETECH.pdf.
Freescale Semiconductor, Inc., "ZRP-1 : ZigBee-ready Platform," at least as early as Oct. 19, 2005, 6 pgs., archived at https://web.archive.org/web/20051019122919/http://www.freescale.com/webapp/sps/site/prod_summary.jsp?code=ZRP-1&nodeId=02XPgQhCQ6m6cy7103.
Freescale Semiconductor, Inc., M68HC08 microcontroller ordering web page, at least as early as Aug. 17, 2004, 5 pgs., archived at https://web.archive.org/web/20040817014804/http://www.freescale.com/webapp/sps/site/taxonomy.jsp?nodeId=01624684498634.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet works," Millennium Edition, 1999, Que Corporation, Indianapolis, IN, all pages.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
Hendron, "File Security, Keychains, Encryption, and More with Mac OS X (10.3+)" Apr. 4, 2005, downloaded from http://www.johnhendron.net/documents/OSX_Security.pdf on or before May 3, 2012, 30 pgs.
Hester et al., "neuRFon(TM) Netform: A Self-Organizing Wireless Sensor Network", Oct. 14, 2002, Proceedings of the Eleventh International Conference on Computer Communications and Networks, pp. 364-369.
Honkanen et al., "Low End Extension for Bluetooth", Sep. 19, 2004, Proceedings of the 2004 IEEE Radio and Wireless Conference, Atlanta, GA, pp. 199-202.
IBM Corporation, "Tadlys' Bluetooth Wireless Local Network for Corporate," Wireless e-business, at least as early as May 6, 2004, 2 pgs., archived at https://web.archive.org/web/20040621130525/http://www.tadlys.com/media/downloads/Corporate%20PVDEE01005-3.pdf.
IBM Corporation, "Tadlys' Bluetooth Wireless Local Network for Hotspots," Wireless e-business, at least as early as May 6, 2004, 2 pgs., archived at https://web.archive.org/web/20040508123915/http://www.tadlys.com/media/downloads/Hotspots%20PVDEE01006-3.pdf.
IEEE Computer Society, "IEEE Std 802.15.4 (Trade Mark)—Part 15.4: Wireless Medium Access Control (MAC) and Physical Layer (PHY) Specifications for Low-Rate Wireless Personal Area Networks (LR-WPANs)," The Institute of electrical and Electronics Engineers, Inc., New York, NY, Oct. 1, 2003, 679 pgs.
IEEE, "IEEE 802.15 WPANTM Task Group 4 (TG4)" exemplary web page, Aug. 24, 2004, 2 pgs., archived at https://web.archive.org/web/20040824085452/http://www.ieee802.org/15/pub/TG4.html.
International Search Report and Written Opinion for International Application No. PCT/US04/38124, mailed Apr. 7, 2005, 10 pgs.
International Search Report and Written Opinion for International Application No. PCT/US05/00349, mailed Mar. 19, 2008, 10 pgs.
International Search Report and Written Opinion for International Application No. PCT/US05/07535, mailed Dec. 6, 2005, 6 pgs.
International Search Report and Written Opinion for International Application No. PCT/US05/43447, mailed Feb. 22, 2007, 7 pgs.
International Search Report and Written Opinion for International Application No. PCT/US05/46843, mailed Mar. 1, 2007, 10 pgs.
International Search Report and Written Opinion for International Application No. PCT/US07/11102, mailed Oct. 3, 2008, 11 pgs.
International Search Report and Written Opinion for International Application No. PCT/US07/11103, mailed Apr. 23, 2008, 9 pgs.
International Search Report and Written Opinion for International Application No. PCT/US07/11104, mailed Jun. 26, 2008, 9 pgs.
International Search Report and Written Opinion for International Application No. PCT/US07/11105, mailed Oct. 20, 2008, 10 pgs.
International Search Report and Written Opinion for International Application No. PCT/US08/83060, mailed Dec. 29, 2008, 9 pgs.
International Search Report and Written Opinion for International Application No. PCT/US08/87835, mailed Feb. 11, 2009, 8 pgs.
International Search Report and Written Opinion for International Application No. PCT/US09/34095, mailed Mar. 25, 2009, 11 pgs.
International Search Report and Written Opinion for International Application No. PCT/US2009/039943, mailed Jun. 1, 2009, 9 pgs.
International Search Report and Written Opinion for International Application No. PCT/US2014/037609, mailed Dec. 9, 2014, 13 pgs.
International Search Report for International Application No. PCT/US2001/049916, mailed on Apr. 25, 2002, 1 pg.
International Search Report received for PCT Patent Application No. PCT/US2001/049916, mailed on Apr. 25, 2002, 1 page.
Jeyaprakash et al., "Secured Smart Card Using Palm Vein Biometric On-Card-Process," 2008 International Conference on Convergence and Hybrid Information Technology, 2008, pp. 548-551.
Jonker et al., "Digital rights management in consumer electronics products," IEEE Signal Processing Magazine, vol. 21, No. 2, pp. 82-91, Mar. 2004, doi: 10.1109/MSP.2004.1276116.
Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," www.informationweek.com, Jun. 7, 2001, 1 pg.
Korzeniowski, "First Intelligent, Wireless Consumer Devices About to Hit Market," TechNewsWorld, Jul. 28, 2004, 3 pgs., archived at https://web.archive.org/web/20040821061130/http://www.technewsworld.com/story/35376.html%20com/.
Kuhn et al., Introduction to Public Key Technology and the Federal PKI Infrastructure, Feb. 26, 2001, National Institute of Standards and Technology, 54 pgs.
Labrou et al., "Wireless Wallet," Proceedings of the First Annual International Conference on Mobile and Ubiquitous Systems: Networking and Services (MobiQuitos '04), IEEE, Aug. 22-26, 2004, 10 pgs.
Lake, "Downloading for Dollars: Who said buying music off the Net would be easy?" Sound & Vision, Nov. 2000, pp. 137-138.
Lee et al., "Effects of dielectric superstrales on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.

(56) References Cited

OTHER PUBLICATIONS

Lee et al., "Effects of dielectric superstrates on a two-layer electromagnetically coupled patch antenna," Digest on Antennas and Propagation Society International Symposium, 1989, pp. 620-623 vol.2, doi: 10.1109/APS.1989.134763.

Lewis, "Sony and Visa in On-Line Entertainment Venture," New York Times, vol. 145, Thurs. Ed., Nov. 16, 1995, 1 pg.

Liu et al., "A Practical Guide to Biometric Security Technology," IT Pro, vol. 3, No. 1, Jan./Feb. 2001, pp. 27-32.

Machine translation of JPH10049604, 27 pages.

Malan, "Here come Wireless Sensors," Machine Design, Jun. 10, 2004, 3 pgs., archived at https://web.archive.org/web/20040610131354/http:/www.machinedesign.com/ASP/viewSelectedArticle.asp?strArticleId=56796&strSite=MDSite&Screen=CURRENTISSUE.

McIver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.

Micronas, "Micronas and Thomson Multimedia Showcase a New Copy Protection System that Will Drive the Future of Digital Television," www.micronas.com: Jan. 8, 2002, 3 pgs.

Anonymous, "BluePayz: A Seamless Payment Method Using Bluetooth-Enabled Mobile Phones," IP.com Publication Date 2003—Jun. 20, 2003, https://priorart.ip.com/1 PCOM/000015495 (Year: 2003).

Feng Bao, et al., "Design of portable mobile devices based e-payment system and e-ticketing system with digital signature," 2001 International Conferences on Info-Tech and Info-Net. Proceedings (Cat. No. 01 EX479), Beijing, China, 2001, pp. 7-12 vol.6, doi: 10.1109/ICII.2001.982996. (Year: 2001).

Y. Labrou, J. Agre, L. Ji, J. Molina and W . . . - 1. Chen, "Wireless wallet," The First Annual International Conference on Mobile and Ubiquitous Systems: Networking and Services, 2004. MOBIQUITOUS 2004., Boston, MA, USA, 2004, pp. 32-41, doi: 10.1109/MOBIQ.2004.1331708. (Year: 2004).

NPL Search Terms (Year: 2023).

Anonymous, "BluePayz: A Seamless Payment Method Using Bluetooth-Enabled Mobile Phones," IP.com Publication Date 2003-Jun. 20, 2003, https://priorart.ip.eom/1PCOM/000015495 (Year: 2003).

Beaufour, "Personal Servers as Digital Keys," Proceedings of the Second IEEE Annual Conference on Pervasive Computing and Communications (PERCQM'04), Mar. 14-17, 2004, pp. 319-328.

Blip Systems, BlipMobihty, at least as early as Apr. 7, 2004, archived at https://web.archive.org/web/20040407212934/http:/www.blipsystems.com/Default.asp?ID=1 18.

Chen et al."On Enhancing Biometric Authentication with Data Protection." KES2000. Fourth International Conference on Knowledge-Based Intelligent Engineering Systems and Allied Technologies. Proceedings (Cat. No.OOTH8516), vol. 1, Aug. 1, 2000, pp. 249-252.

Costa, "Imation USB 2.0 Micro Hard Drive," Nov. 22, 2005, retrieved from http://www.pcmag.eom/article2/0,2817,1892209,00.asp on or before Oct. 11, 2011, 2 pgs.

Dai et al., Toward Blockchain-Based Accounting and Assurance, Journal of Information Systems, vol. 31, No. 3, Fai 2017, pp. 5-21.

Lockton et al., RFID: The next serious threat to privacy, Ethics and Information Technology (2005) 7:221-231 (Year: 2006).

Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.

Reescale Semiconductor, Inc., "ZigBeeTM," Freescale Semiconductor Wireless Standards, at least as early as Aug. 18, 2004, 2 pgs., archived at https://web.archive.org/web/20040818075046/http:/www.freescale.com/webapp/sps/site/overview.jsp?nodeId=02XPgQhHPRjdyB.

Rodriguez et al., "In-building location using Bluetooth," Proceedings of the International Workshop on Wreless Ad-Hoc Networks (IWWAN 2005), May 23-26, 2005, London, England, 7 pgs.

Schneier, Applied Cryptography, Second Edition: Protocols, Algorithms, and Source Doe in C, Jan. 1, 1996, John Wley & Sons, Inc., 1027 pgs.

SplashId, "SplashID—Secure Password Manager for PDA's and Smartphones," Mar. 8, 2007, retrieved from http://www.splashdata/com/splashid/via http://www.archive.org/on or before Oct. 11, 2011, 2 pgs.

Tadlys Ltd., "Bluetooth Glossary," at least as early as Jun. 2004, 12 pgs., archived at https://web.archive.org/web/20040531082349/http://www.tadlys.com/pages/Downloads_content.asp?intGlobalId=1.

Tadlys Ltd., "Indoor Location Networks," at least as early as Apr. 3, 2004, 1 pg., archived at https://web.archive.org/web/20040403200221/http:/www.tadlys.com/Pages/Product_content.asp?iGlobalId=2.

\* cited by examiner

PROXIMITY-SENSOR SUPPORTING MULTIPLE APPLICATION SERVICES

CROSS-REFERENCE TO RELATED APPLICATIONS

The present application is a continuation of and claims priority under 35 USC § 120 to U.S. application Ser. No. 16/997,590, filed Aug. 19, 2020, titled "Proximity-Sensor Supporting Multiple Application Services," which is a continuation of U.S. application Ser. No. 15/643,734, filed Jul. 7, 2017, titled "Proximity-Sensor Supporting Multiple Application Services," which is a continuation of U.S. application Ser. No. 14/185,877, filed Feb. 20, 2014, titled "Proximity-Sensor Supporting Multiple Application Services", which is a continuation of U.S. application Ser. No. 12/268,397, filed Nov. 10, 2008, titled "Proximity-Sensor Supporting Multiple Application Services" and claims the benefit of priority under 35 U.S.C. § 119(e) of (a) U.S. Provisional Application No. 60/986,939 entitled "Location Tracking System and User Interface," filed on Nov. 9, 2007, by Andrew Haras, David L. Brown, John J. Giobbi and Fred S. Hirt; and (b) U.S. Provisional Application No. 61/080,916 entitled "TruProx White Paper," filed on Jul. 15, 2008, by John J. Giobbi, the entireties of which are hereby incorporated by reference.

Applicants hereby notify the USPTO that the claims of the present application are different from those of the aforementioned related application. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

BACKGROUND

1. Field of Art

The invention generally relates to personal digital keys and corresponding sensors, capable of proximity detection/location determination and auxiliary data services/application services.

2. Description of the Related Art

Proximity sensors and location tracking are technologies with many applications. For example, proximity sensors can be used to provide secure access to physical and/or digital assets, based on biometrics, passwords, PINs, or other types of authentication. Proximity sensors typically have advantages of being less cumbersome, easier to use, and more flexible in form factor and implementation. Proximity sensors can be used to control access to resources and/or to authenticate individuals, for example.

One possible application that can take advantage of proximity sensors is location tracking. RFID tracking is one example. In RFID, RFID tags are attached to objects to be tracked. RFID readers then interact with the RFID tags to determine the location of the tag. Regardless of how it is accomplished, location tracking (i.e., knowledge about the location of an object or person) is generally useful. For example, location tracking information can be used to track inventory and trace the route of objects through various locations. It can be used for time and motion studies. If tags are attached to people, then tracking of people can be used to better understand their behavior. Knowledge about a person's location (and/or their past locations and projected future locations) could be used to provide better services to that person.

However, most proximity systems and location tracking systems have limited capabilities. Typically, the proximity sensor, RFID tag or similar device is a dumb device, in the sense that the device is designed and has the capability only to report its location. For example, such devices typically do not have the capabilities to run different applications or to even interact with different applications. Furthermore, these systems typically are proprietary and narrowly tailored for a specific situation, thus preventing easy expandability to other situations or third party applications.

SUMMARY

Various drawbacks of the prior art are overcome by providing a personal digital key (e.g., which can be carried by a human) that contains a memory having different service blocks. Each service block accessible by a corresponding service block access key. As the personal digital key (PDK) moves around, it is detected by sensors. Each sensor covers an area that will be referred to as a microcell. The microcells are sized based on proximity. For example, if a sensor is used to detect proximity to a specific object, the sensor may be located on or around the object and its microcell adjusted to a size that indicates proximity to the object of interest. The specific size of microcells may vary depending on the object, environment, and specific application. However, microcells typically will be relatively small. For example, diameters in the 1-10 meter range would not be unusual. The sensors report position data (e.g., that the PDK is in the proximity of or within the microcell of a specific sensor), thus enabling location tracking of the PDK. The sensors also provide a data path to various applications. An application that has access to a service block access key can therefore access the corresponding service block on the PDK. The sensors themselves may also contain service block access keys.

In one implementation, a sensor management module (SMM) manages the network of sensors. The sensors are positioned at known locations. Each sensor covers a microcell and communicates wirelessly with PDKs in its microcell, gathering position data about these PDKs. The sensors transmit the position data to the SMM, which generates location tracking data for the PDK based on the position data. The SMM is configured to facilitate communication with one or more applications, and can make the location tracking data available to the applications. In addition, the SMM and the sensor provide a data path between a service block on the PDK and an application that has access to the corresponding service block access key.

As a result, application(s) can interact directly with the PDK. For example, the service blocks on the PDK may contain biometric or other information used for authentication or verification. Alternately, the service blocks may be used as secure local memory for the application. There can be various mappings between the service blocks and the applications; one-to-one mapping is not required. Preferably, different applications can have access to different service block access keys and the sensor and SMM provide a data path between each application and the corresponding service block(s) on the PDK, thus facilitating the use of multiple applications with one PDK.

The sensor itself can also contain a service block access key in order to access the corresponding service block on the PDK. In another aspect, the sensor can also include a biometric input. Other types of security inputs can also be used, for example passwords or PINs.

In one useful scenario, the sensors are located inside a structure and the SMM tracks the location of the PDK within the structure, due to the PDK's proximity to the various sensors. For example, the sensors may be located inside a building, the PDK is sized to be carried by a human, and the SMM tracks the location of the PDK within the building as a proxy for the location of the human. A similar task can be accomplished for outdoor or mixed (indoor/outdoor) sites. For example, guests at an amusement park may be issued PDKs as they enter, with sensors located to indicate proximity to various points of interest. The guests can then be located and/or tracked as they move from one point of interest to the next.

In one architecture, the SMM communicates with applications via an application layer message bus. In another aspect, the system also includes a coordinator module communicatively coupled to the SMM. The coordinator module broadcasts a beacon to the sensors and PDKs. The sensors and PDKs synchronize to the beacon.

In another alternative, a sensor is communicatively coupled to an application. The sensor is capable of communicating wirelessly with a personal digital key (PDK) when the PDK is in range of the sensor. The PDK contains a memory having service blocks. Each service block is accessible by a corresponding service block access key. The sensor provides a data path between a service block on the PDK and an application that has access to the corresponding service block access key.

Other aspects of the invention include systems and components corresponding to the above, and methods corresponding to all of the foregoing.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
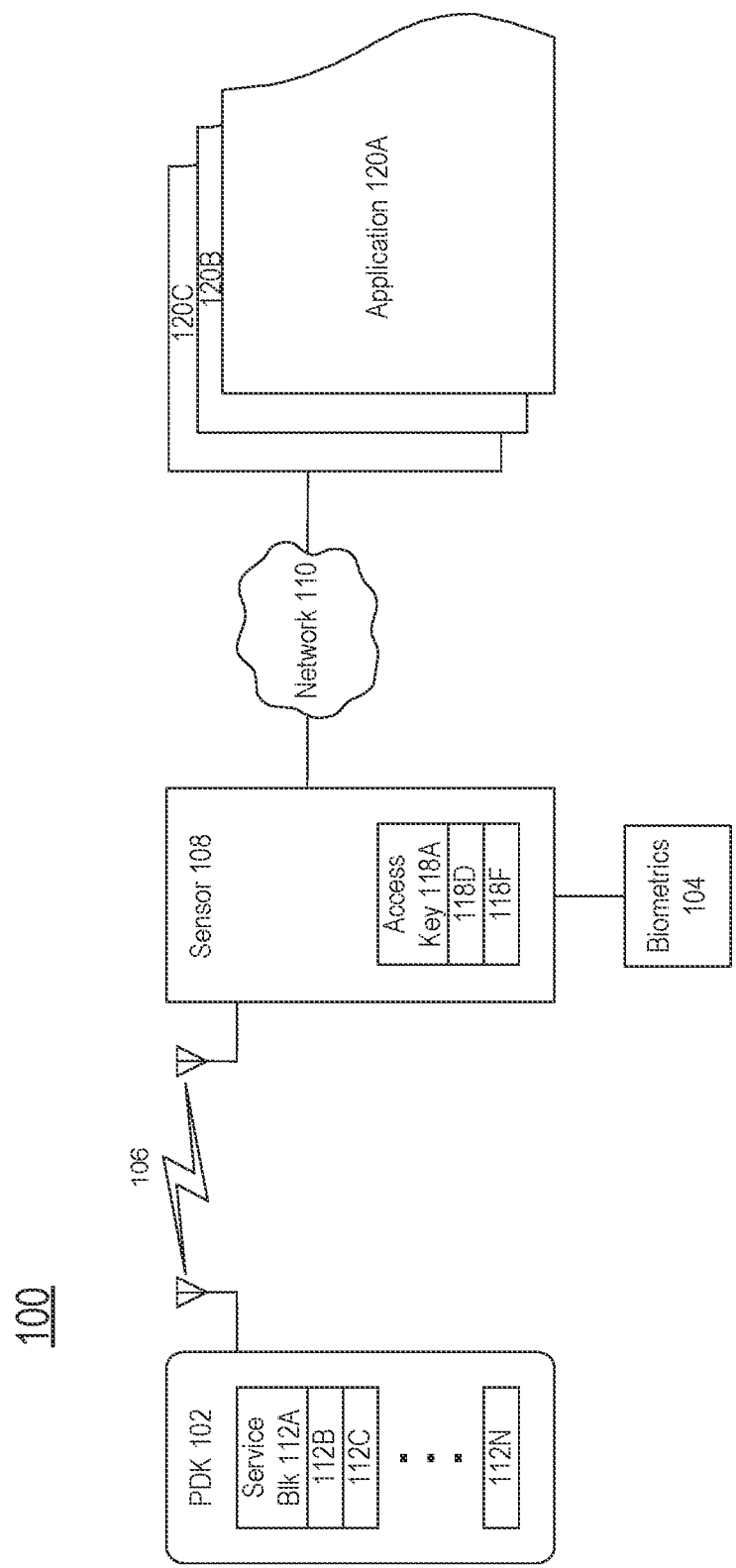
FIG. 1 is a block diagram illustrating one embodiment of a system according to the invention.

FIG. 1 is a high level block diagram illustrating a system for allowing access to multiple applications (or services). The system 100 comprises a Personal Digital Key (PDK) 102, a sensor 108, a network 110 and one or more applications 120 (including services). The sensor 108 is coupled to the PDK 102 by a wireless link 106 and coupled to a network 110 by either a wired or wireless link. In this example, the applications 120 are also accessed over network 110. The sensor 108 is also adapted to receive a biometric input 104 from a user and is capable of displaying status to a user. In alternative embodiments, different or additional resources and databases may be coupled to the network 110, including for example registries and databases used for validation or to check various registrations of the user. In another embodiment, the sensor 108 operates as a standalone device without a connection to the network 110.

Figure 2:
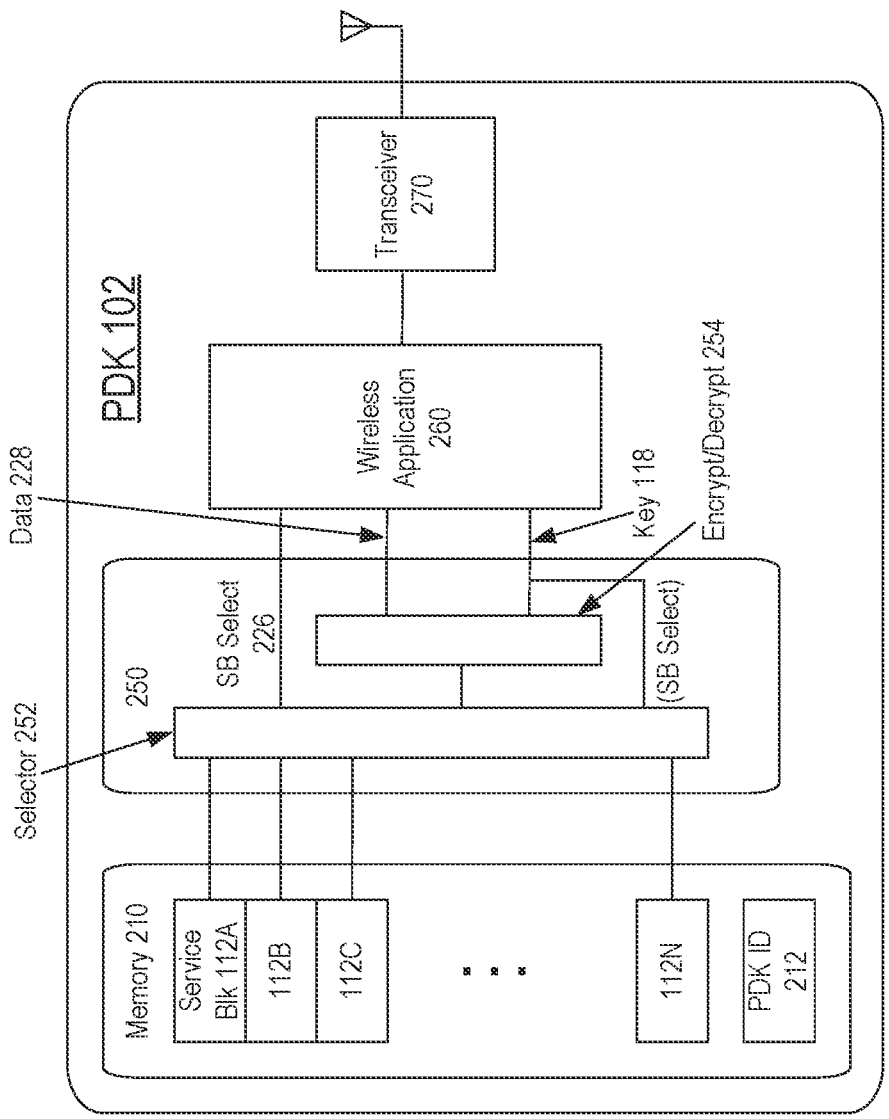
FIG. 2 is a block diagram illustrating one embodiment of a Personal Digital Key (PDK).

The PDK 102 includes multiple service blocks 112A-N as described in more detail in FIG. 2. Each service block 112 is accessed using a corresponding service block access key 118. In this example, the sensor 108 contains three of the service block access keys 118A,D,F. The service block access keys 118 allow the sensor 108 to unlock information stored in the corresponding service blocks 112, which information is used as local secured information.

In one example, a biometric is required in order to access specific service blocks 112 in the PDK 102. Verification of the biometric is achieved by using service block 112A. The sensor 108 stores the corresponding service block access key 118A and uses this key to unlock the biometric service block 112A, which stores a valid biometric. A current biometric is received using biometric input 104. The sensor 108 then verifies the stored biometric (from service block 112A) against the recently acquired biometric (from input 104). Upon proper verification, various applications 120 are permitted to connect to the PDK 102 via the sensor 108 and/or to gain access to other service blocks 112.

The system 100 can be used to address applications 120 where it is important to authenticate an individual for use. Generally, the sensor 108 wirelessly receives information stored in the PDK 102 that uniquely identifies the PDK 102 and the individual carrying the PDK 102. The sensor 108 can also receive a biometric input 104 from the individual. Based on the received information, the sensor 108 determines if access to the application 120 should be granted. In this example, the system 100 provides authentication without the need for PINs or passwords (although PINs and passwords may be used in other implementations). Moreover, personal biometric information need not be stored in any local or remote storage database and is only stored on the user's own PDK (in one embodiment).

The credibility of the system 100 is ensured by the use of a PDK 102 that stores trusted information. The PDK 102 is a compact, portable uniquely identifiable wireless device typically carried by an individual. The PDK 102 stores digital information in a tamper-proof format that uniquely associates the PDK 102 with an individual. Example embodiments of PDKs are described in more detail in U.S. patent application Ser. No. 11/292,330, entitled "Personal Digital Key And Receiver/Decoder Circuit System And Method" filed on Nov. 30, 2005; U.S. patent application Ser. No. 11/620,581 entitled "Wireless Network Synchronization Of Cells And Client Devices On A Network" filed on Jan. 5, 2007; and U.S. patent application Ser. No. 11/620,577 entitled "Dynamic Real-Time Tiered Client Access" filed on Jan. 5, 2007, the entire contents of which are all incorporated herein by reference.

The sensor 108 wirelessly communicates with the PDK 102 when the PDK 102 is within a proximity zone (i.e., within a microcell) of the sensor 108. The proximity zone can be, for example, several meters in radius and preferably can be adjusted dynamically by the sensor 108. Thus, in contrast to many conventional RF ID devices, the sensor 108 can detect and communicate with the PDK 102 without requiring the owner to remove the PDK 102 from his/her pocket, wallet, purse, etc. Generally, the sensor 108 receives uniquely identifying information from the PDK 102 and initiates an authentication process for the individual carrying the PDK 102. In one embodiment, the sensor 108 is adapted to receive a biometric input 104 from the individual. The biometric input 104 comprises a representation of physical or behavioral characteristics unique to the individual. For example, the biometric input 104 can include a fingerprint, a palm print, a retinal scan, an iris scan, a photograph, a signature, a voice sample or any other biometric information such as DNA, RNA or their derivatives that can uniquely identify the individual. The sensor 108 compares the biometric input 104 to information received from the PDK 102 to determine authentication. Alternatively, the biometric input 104 can be obtained by a biometric sensor on the PDK 102 and transmitted to the sensor 108 for authentication. In additional alternative embodiment, some or all of the authentication process can be performed by the PDK 102 instead of the sensor 108.

In this example, the sensor 108 is further communicatively coupled to the network 110 in order to receive and/or transmit information to remote databases for remote authentication. In an alternative embodiment, the sensor 108 includes a non-volatile data storage that can be synchronized with one or more remote databases or registries. Such an embodiment alleviates the need for a continuous connection to the network 110 and allows the sensor 108 to operate in a standalone mode and for the local data storage to be updated when a connection is available. For example, a standalone sensor 108 can periodically download updated registry entries and perform authentication locally without any remote lookup.

In yet another alternative, a standalone sensor 108 may have a pre-configured secure access key 118 and encryption algorithm, or a variable access key 118 that changes, for example based on time and sensor ID. One example application would be a sensor 108 located in a hotel room door, where the sensor could constantly compute a different access key 118 based on time, and the PDK 102 could be associated with this key during the hotel registration process.

The network 110 provides communication between the sensor 108 and various validation databases and/or registries, in addition to the applications 120. In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

In one aspect, the sensor 108 may connect to a validation database that stores additional information that may be used for authorizing a transaction to be processed at the sensor. For example, in purchase transactions, the sensor 108 may interact with a credit card validation database that is separate from the merchant providing the sale. Alternatively, a different database may be used to validate different types of purchasing means such as a debit card, ATM card, or bank account number.

In another aspect, the sensor 108 may connect to various registries that store, among other items, PDK, notary, and/or sensor information. In one embodiment, a registry stores biometric or other types of information in an encoded format that can only be recovered using an algorithm or encoding key stored in the PDK. Information stored in the registries can be accessed by the sensor 108 via the network 110 for use in the authentication process. Two basic types of registries are private registries and a Central Registry. Private registries are generally established and administered by their controlling entities (e.g., a merchant, business authority, or other entity administering authentication). Private registries can be custom configured to meet the specialized and independent needs of each controlling entity. A Central Registry is a highly-secured, centrally-located database administered by a trusted third-party organization. In one embodiment, all PDKs 102 are registered with the Central Registry and may be optionally registered with one or more selected private registries. In alternative embodiments, a different number or different types of registries may be coupled to the network 110.

The service blocks 112 can be used for purposes other than user authentication. For example, information used or produced by an application 120 can be transferred back and forth to the corresponding service block 112. That is, each service block 112 can be used as a local secure memory for the corresponding application 120. Thus, a service 120B may store certain sensitive information in service block 112B, and a separate service 120C will not be able to access that information without the corresponding access key 118B. In this example, the sensor 108 only holds access keys 118A,D,F and does not hold access key 118B. The application 120B may hold the access key 118B, thus allowing it to access service block 112B but preventing application 120C from accessing the service block 112B. Note that this implementation would also prevent the sensor 108 acting alone from accessing the service block 112B.

Turning now to FIG. 2, an example embodiment of a PDK 102 is illustrated. The PDK 102 comprises a memory 210, control logic 250, wireless application 260 and a transceiver 270. The PDK 102 can be standalone as a portable, physical device or can be integrated into commonly carried items. For example, a PDK 102 can be integrated into a portable electronic device such as a cell phone, Personal Digital Assistant (PDA), or GPS unit, an employee identification tag, clothing, or jewelry items such as watches, rings, necklaces or bracelets. In one embodiment, the PDK 102 can be, for example, about the size of a Subscriber Identity Module (SIM) card and be as small as a square inch in area or less. In another embodiment, the PDK 102 can be easily contained in a pocket, on a keychain, or in a wallet. The PDK can also contain other components not shown, for example various other inputs, outputs and/or interfaces (serial or parallel).

The memory 210 can be a read-only memory, a once-programmable memory, a read/write memory or any combination of memory types, including physical access secured and tamperproof memories. The memory 210 typically stores a unique PDK ID 212. The PDK ID 212 comprises a public section and a private section of information, each of which can be used for identification and authentication. In one embodiment, the PDK ID 212 is stored in a read-only format that cannot be changed subsequent to manufacture. The PDK ID 212 is used as an identifying feature of a PDK 102 and distinguishes between PDKs 102 in private or Central registry entries. In an alternative embodiment, the registries can identify a PDK 102 by a different ID than the PDK ID 212 stored in the PDK 102, or may use both the PDK ID 212 and the different ID in conjunction. The PDK ID 212 can also be used in basic PDK authentication to ensure that the PDK 102 is a valid device.

The memory 210 also stores the various service blocks 112A-N. Whether a particular service block 112 is stored in volatile or non-volatile memory may be determined by the specific application. In one approach, the original issuer of the PDK defines how the internal memory 210 may be used for service blocks 112. In some cases, the issuer may choose to only allow their service blocks to be stored, in which case third party applications will not be able to store service blocks in memory 210. In other cases, the issuer may allow any third party service 120 to use available service blocks 112. If a new service block is created, then memory for that service block is allocated. The specific location of the service block and generation of the corresponding service block access key can be handled by the PDK 102, or can be handled via an external service.

Regardless of how created, once created, external applications (such as applications 120 in FIG. 1) can gain access to a specific service block 112 by proving the corresponding access key 118. In FIG. 2, this is shown conceptually by control logic 250. The wireless application 260 on the PDK 102 communicates to the sensor (not shown in FIG. 2) via transceiver 270. The wireless application provides a service block select 226 and a service block access key 118 in order to store, retrieve and/or modify data in a service block 112. The selector 252 selects a service block 112 based on the select signal 226 and the access key 118. The encryption engine 254 encrypts/decrypts data 228 flowing to/from the service block 112 based on the access key 118 (or some other key generated based on the access key, for example a session key). In an alternate method, the service block 112 may be selected based on the service block access key 118, eliminating the need for a separate select signal 226.

The PDK 102 may also include other data and applications. For example, the PDK 102 typically will include various profiles. Many different types of profiles are possible. A biometric profile, for example, includes profile data representing physical and/or behavioral information that can uniquely identify the PDK owner. A PDK 102 can store multiple biometric profiles, each comprising a different type of biometric information. The same biometric information can also be stored multiple times in a PDK 102. For example, two different applications may use the right index fingerprint, and that biometric information may be stored in two different service blocks, one for each application. In addition, the PDK 102 may also store one or more biometric profile "samples" associated with each biometric profile. Profiles may also store one or more PINs or passwords associated with the PDK owner, or one or more pictures of the PDK owner. A profile can further include personal identification information such as name, address, phone number, etc., bank information, credit/debit card information, or membership information. This information can be useful for transactions.

The transceiver 270 is a wireless transmitter and receiver for wirelessly communicating with a sensor 108 or other wireless device. The transceiver 270 can send and receive data as modulated electromagnetic signals. Moreover, the data can be encrypted by the transceiver 270 and transmitted over a secure link. Further, the transceiver 270 can actively send connection requests, or can passively detect connection requests from another wireless source. In one embodiment, the transceiver 270 is adapted to communicate over a range of up to around 5 meters. In another embodiment, the transceiver 270 range can be varied.

Figure 3:
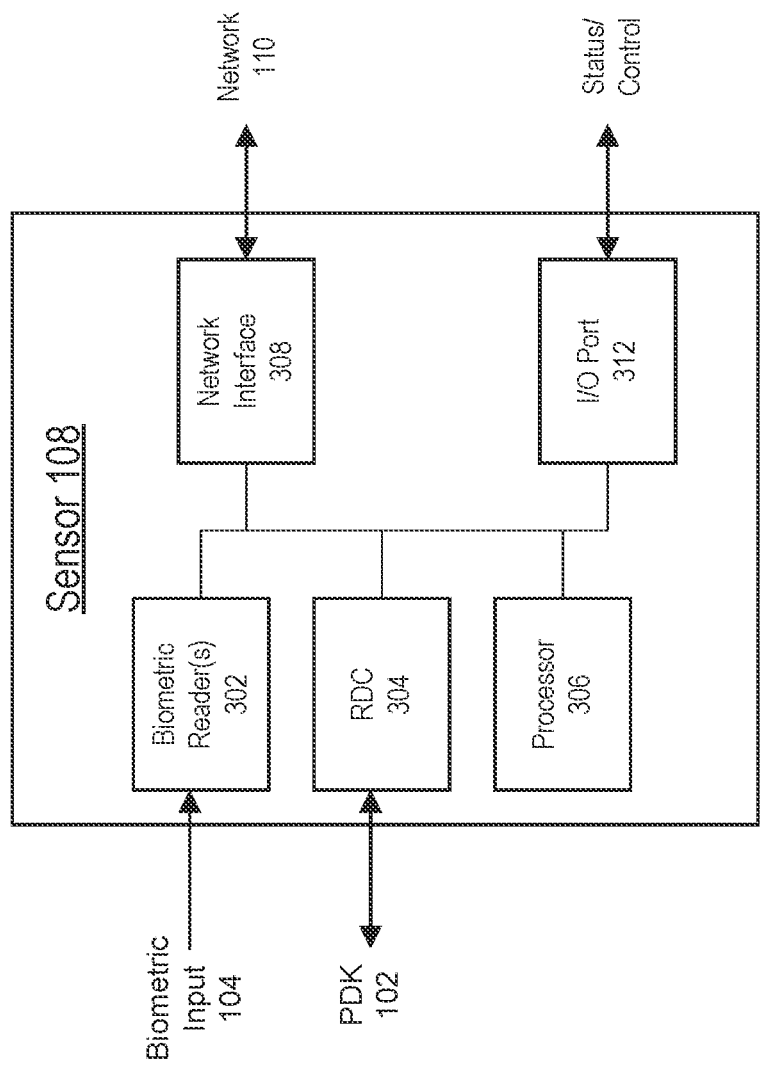
FIG. 3 is a block diagram illustrating one embodiment of a sensor.

Turning now to FIG. 3, an example embodiment of a sensor 108 is illustrated. The embodiment includes one or more biometric readers 302, a receiver-decoder circuit (RDC) 304, a processor 306, a network interface 308 and an I/O port 312. In alternative embodiments, different or additional modules can be included in the sensor 108.

The RDC 304 provides the wireless interface to the PDK 102. Generally, the RDC 304 wirelessly receives data from the PDK 102 in an encrypted format and decodes the encrypted data for processing by the processor 306. An example embodiment of an RDC is described in U.S. patent application Ser. No. 11/292,330 entitled "Personal Digital Key And Receiver/Decoder Circuit System And Method," the entire contents of which are incorporated herein by reference. Encrypting data transmitted between the PDK 102 and sensor 108 minimizes the possibility of eavesdropping or other fraudulent activity. In one embodiment, the RDC 304 is also configured to transmit and receive certain types of information in an unencrypted, or public, format.

The biometric reader 302 receives and processes the biometric input 104 from an individual. In one embodiment, the biometric reader 302 is a fingerprint scanner. Other embodiments of biometric readers 302 include retinal scanners, iris scanners, facial scanner, palm scanners, DNA/RNA analyzers, signature analyzers, cameras, microphones, and voice analyzers. Furthermore, the sensor 108 can include multiple biometric readers 302 of different types.

The network interface 308 can be a wired or wireless communication link between the sensor 108 and network 110. For example, in one type of authentication, information is received from the PDK 102 at the RDC 304, processed by the processor 306, and transmitted to external authentication databases through the network interface 308. The network interface 308 can also receive data sent through the network 110 for local processing by the sensor 108. In one embodiment, the network interface 308 provides a connection to a remote system administrator to configure the sensor 108 according to various control settings.

The I/O port 312 provides a general input and output interface to the sensor 108. The I/O port 312 may be coupled to any variety of input devices to receive inputs such as a numerical or alphabetic input from a keypad, control settings, menu selections, confirmations, and so on. Outputs can include, for example, status LEDs, an LCD, or other display that provides instructions, menus or control options to a user.

Figure 4:
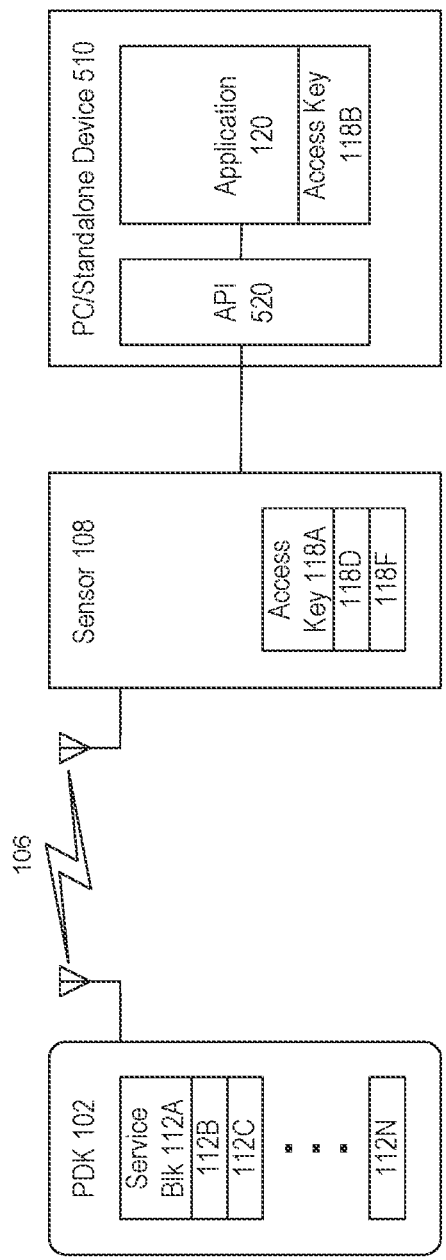
FIGS. 4-6 are block diagrams illustrating further embodiments of systems according to the invention.
Figure 5:
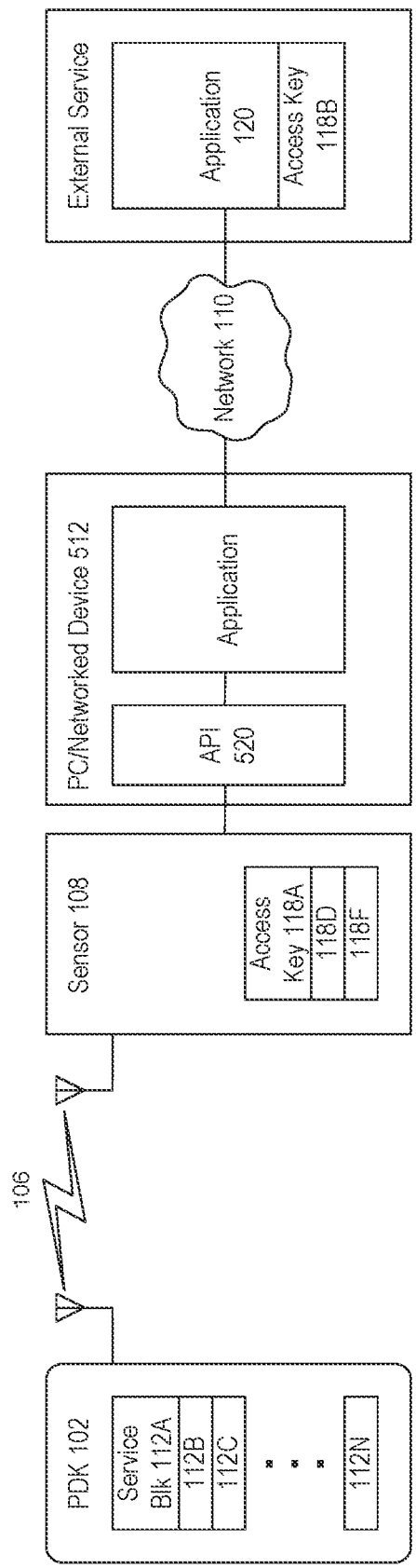
Figure 6:
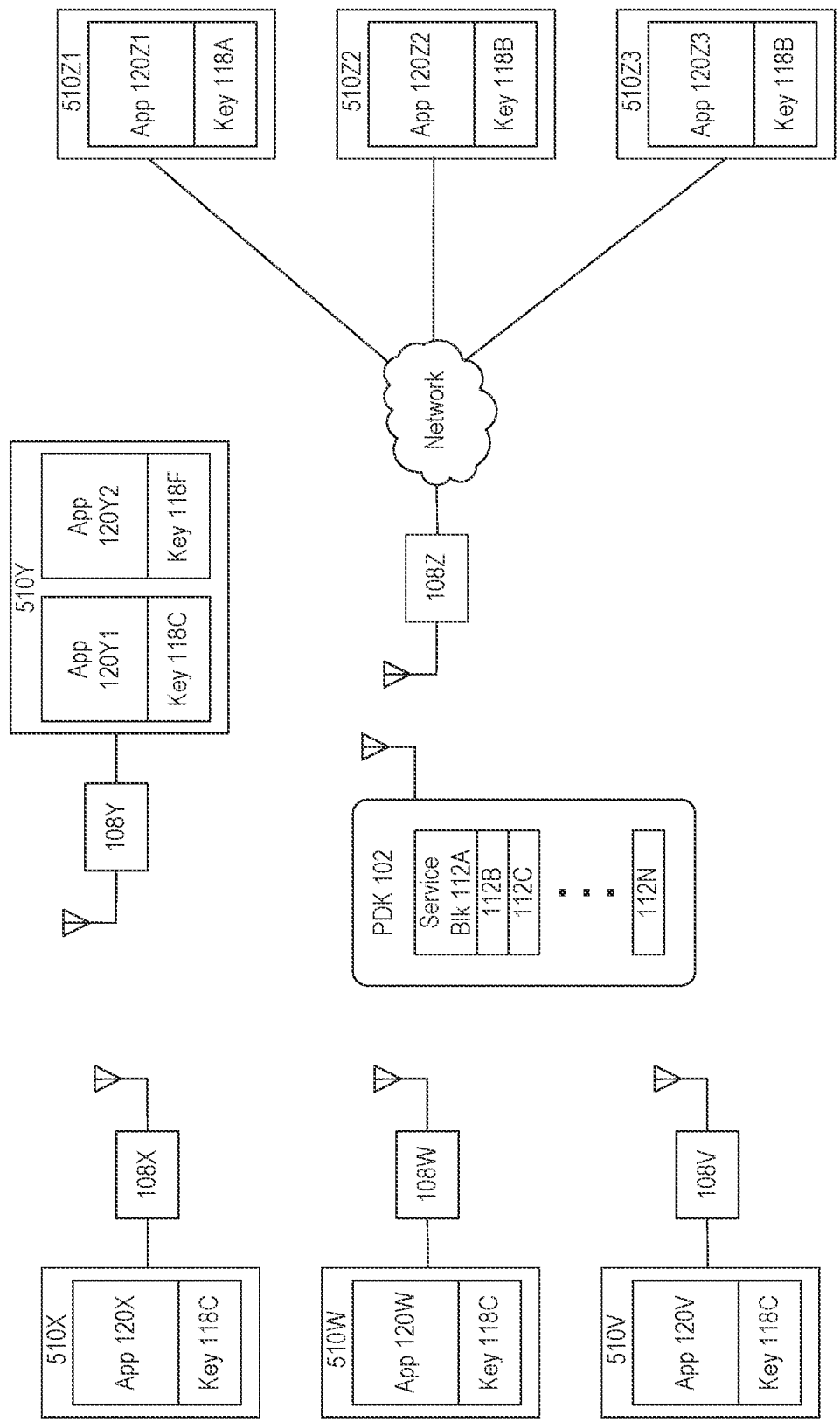

FIGS. 4-6 are high level block diagrams illustrating additional examples of applications accessing service blocks. FIGS. 4 and 5 illustrate that the application 120 need not be located at any particular location on the network. Rather, the service block 112 is accessed from any application 120 that can attach (in a network sense) to the sensor 108.

In FIG. 4, the sensor 108 attaches to the PDK 102 within its microcell, using service block access key 118(A) and service block 112(A). A personal computer or other standalone device 510 is attached to the sensor 108, either directly or via a network. In this example, the device 510 communicates with the sensor via a standardized API 520. An application 120 executes on the device 510 and has access to the service block access key 118(B). It uses this key to gain access to the corresponding service block 112(B). This is an example of a local application 120.

FIG. 5 illustrates a remote application. In this example, the sensor 108 attaches to the PDK 102 in the same manner as FIG. 4, using service block access key 118A and service block 112A. However, application 120 is not executing on a local device. Rather, it executes remotely. Here, it is shown as an external service 120. However, service 120 can still gain access to service block 112B by use of service block access key 118B, although it does so via network 110 and intermediate device 512. Although the sensor 108 is the device that attaches to the PDK 102, a local or remote application 120 with the right credentials may store or retrieve information in a service block 112 in the PDK 102.

The PDK itself can also be configured to prevent the same source from repeating invalid access attempts to the PDK's service blocks. The PDK may monitor access to the service blocks. When an attached service makes multiple unsuccessful attempts to unlock a service block, the PDK tracks this and eventually ignores the requests from that service for a period of time. Alternately, the PDK may disconnect from the network or take other actions.

An example of a local application (FIG. 4) is an auto login/logoff of a personal computer. When a PDK 102 is within the proximity of the personal computer 510, the PDK 102 is detected and the sensor 108 attaches to the PDK 102 (using service block 112A). The login/logoff application 120 then sends the service block access key 118B along with a request for the contents of the service block 112B to the PDK 102 via the sensor 108. For example, a standard may specify that particular service block 112B contains username and password. These are returned to the application 120, allowing automatic login to the personal computer 510.

An example of a remote application (FIG. 5) is a credit card transaction. The sensor 108 in this case could be a credit card terminal. When the PDK 102 is brought in close proximity, the credit card terminal 108 attaches to the PDK 102 (using service block 112A). The terminal 108 then sends the PDK ID 212 to the credit card issuer (the external service) for identification. The credit card issuer may then send a service block access key 118B back to the sensor 108, where it is passed on to the PDK 102 to unlock a specific service block 112B. The contents of the service block 112B could then be sent back to the credit card issuer where further decryption could occur and the credit card holder could be verified. Once verified, the credit card terminal displays that the transaction is approved.

These two examples illustrate basic concepts of the capabilities of the service blocks and how an application (service) may use them. Since service blocks preferably are both readable and writable, services may use them as they see fit (i.e. debit, username/password, credit card information, etc.). In some sense, the service block acts as a secure local memory on the PDK.

FIGS. 4 and 5 illustrate a basic case where a single application accesses a single service block on a single PDK via a single sensor. The invention is not limited to this case. FIG. 6 illustrates a case with multiple applications, sensors, and service blocks. This illustrates the sharing of service blocks. As shown, service blocks may be limited to a single service or source or may be shared across multiple services and sources. A service block 112 is a protected memory element which allows an application 120 with the right credentials to access it. In this example, applications 120W, 120X and 120Y1 can each access service block 112C since each application has access to service block access key 118C. Similarly, applications 120V, 120Z2 and 120Z3 can each access service block 112B. Although not shown in FIG. 6, it is also possible for an application to access more than one service block. FIG. 6 also shows a situation where applications 120Z1-3 running on different devices 510Z1-3 all access the PDK 102 through the same sensor 108Z. Each sensor 108 covers a certain proximity zone (i.e., microcell). The presence of the PDK 102 within a microcell indicates proximity of the PDK to that particular sensor.

Also shown is a device 510Y with two applications 120Y1 and 120Y2, each of which accesses a different service block. In some cases, the first application 120Y1 is enabled from a first service block 112C, thus allowing a second application 120Y2 to operate using a second service block 112F (although the two applications need not be on the same device 510). For example, the first application 120Y1 might be the auto login/logoff, where a user logs in to a personal computer via a service block 112C that provides a username and password. Now that the user is logged in, the user wishes to attach to his credit card company. The user types in the web address of the credit card provider, where the credit card provider requests the user's credentials. First, the user may have to provide some live biometric information. Application 120Y2 compares this against a biometric stored in a second service block 112F on the PDK. After the sensor 108Y verifies the correct biometrics, the sensor indicates to the PDK that external services may now access their service blocks. The credit card provider 120Z1 then sends its service block access key 118A to the PDK where this third service block 112A is retrieved and sent back to the credit card issuer. The credit card issuer then verifies the data and authorizes the user's transaction.

Furthermore, although the above scenarios focus mostly on service blocks in the PDK, applications may also use the basic authentication function that allows the PDK and sensor to verify each other. In this scenario, once the sensor and PDK finish their verification the application is signaled. The application may then use this information as an assurance that the PDK is a legitimate device (but not necessarily that the holder of the device is legitimate).

In certain cases, access to a service block 112 may allow the application 120 to access various input/outputs on the PDK. For example, the PDK may have several inputs and/or outputs, as well as a serial (or other) interface. The inputs may be either transition triggered or level triggered. An example of a transition triggered event might be a button press, where level triggered might be turning a switch on. Multiple outputs may also exist where they may also be pulsed or level outputs. Finally an interface may allow attachment of an external device, which may then send data through the PDK to the application. In many cases, the inputs and outputs may be simple push button switches and LEDs used to allow a user to interact with an application.

Since the number of applications is limitless, different applications may use the inputs and outputs for different functionality. For example, a user walking into a casino may require attention from a service representative and if the casino has enabled button 1 for this functionality, when the user depresses button 1, an attendant is alerted with information related to the user and the location of the user. In a different application, an actual button may not exist, but it may be tied to an output of another device indicating when a piece of equipment was in use. Whenever the device was in use, the PDK transmits the input 1 active alert back to the backend application. The backend application may then be using this information to determine when the equipment must be recalibrated based on its usage.

This is also true for outputs and any interfaces. Outputs may be used to turn on a light or sound an audible tone used to locate an asset in a building. For example, there may be 20 pieces of equipment in a room which all show up using a location tracking program, but the user would then have to sift through each piece of equipment until the right one is located. Using an output as described above, a light could be lit and the equipment could be immediately located within the room. The interface allows another attached application to the PDK to send information to an end application attached to the sensor. In this case the sensor provides a medium to push data to an external source.

Figure 7:
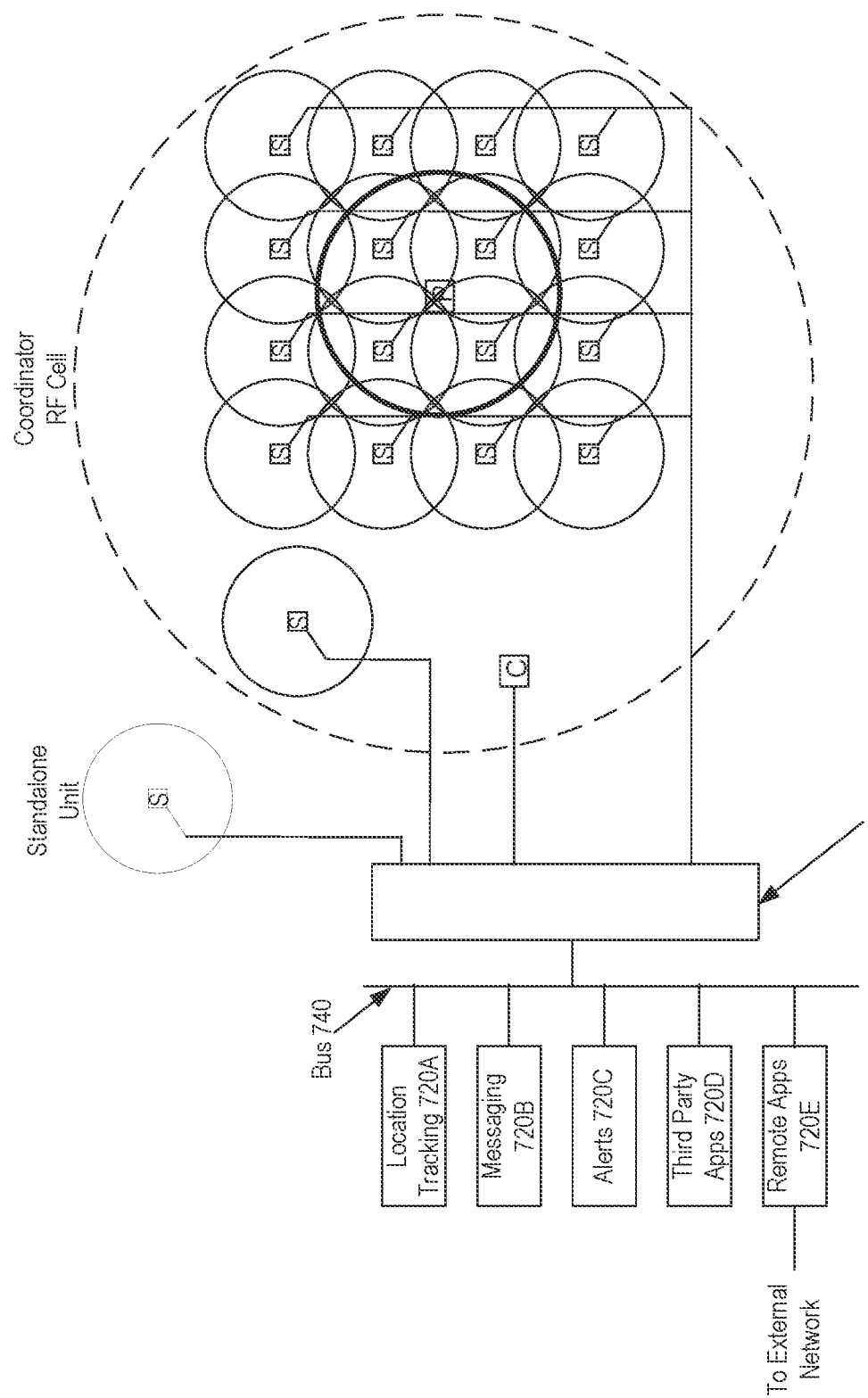
FIG. 7 is a block diagram illustrating one embodiment of a system with networked sensors.

FIG. 7 is a high level block diagram illustrating one embodiment of a system with networked sensors. In this example, multiple sensors (marked "S") are attached to a Sensor Management Module (SMM) 730. The SMM 730 provides data routing for the sensors (e.g., to and from applications 720A-E). In this example, the SMM 730 also receives data from the sensors and processes this data to provide location tracking of PDKs (marked "P") that are within the sensor field. In this implementation, the system also includes an application layer message bus 740, over which the SMM 730 and applications 720 can exchange messages. This allows multiple applications 720 to simultaneously communicate with PDKs and make use of the location tracking of the PDKs. The application layer message bus 740 may also be extended to other applications via a remote application interface.

In FIG. 7, each sensor's microcell (i.e., proximity zone) is denoted by a circle around the sensor. Similarly, the PDK's range is shown by the heavy larger circle. In the example shown, the PDK is in range of four different sensor zones and any of the four sensors may establish communications to the PDK. Using a network topology as shown, the SMM may instruct a specific sensor to attach to the PDK. Once established, the communication link will allow the PDK to communicate with various applications 720, in this example via the SMM 730 and bus 740. Applications 720 will be able to access service blocks on the PDK through the use of service block access keys, as described above.

In addition, in this example, the sensors are at known locations, preferably at fixed locations. For example, sensors may be distributed throughout a building or other structure or site (including outdoors). The sensors interact with the PDK in a manner that allows the sensors to gather position data about the PDK. This position data is sent by the sensors to the SMM 730, which processes the data to determine the PDK's position and to provide location tracking of the PDK over time. The position and/or location tracking information can then be made available to applications 720 via bus 740, in addition to allowing the applications 720 to communicate with the PDK.

Location tracking of the PDK by the sensor network can be achieved in different ways, one of which will be described below. The example in FIG. 7 uses a coordination module (marked "C") or simply coordinator, although this is not required in other implementations. The large dashed circle shows the coordinator's cell. In this example, the sensors preferably contain two transceivers, one to communicate with the coordinator on what will be referred to as the control channel and another to communicate with the PDK on what will be referred to as the traffic channel.

Figure 8:
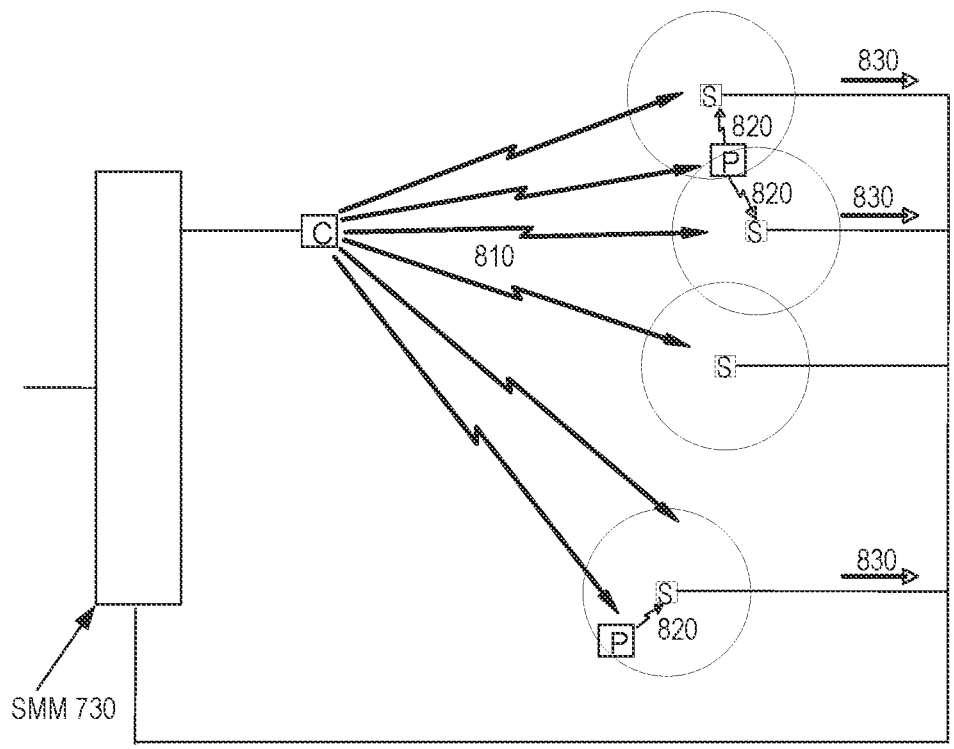
FIGS. 8-9 are block diagrams illustrating operation of the system in FIG. 7.

FIG. 8 illustrates operation of the system in FIG. 7. The coordinator C broadcasts 810 a periodic beacon on a control channel. The sensors and PDKs synchronize to this periodic beacon. On the control channel, when a sensor is not receiving the broadcasted beacon, it is timesharing between listening for a PDK ALOHA response and possibly sending a command to a specific PDK. The PDK, after detecting the beacon, remains on the control channel and continues to periodically wake up, receive the beacon, and realign its timing. By using system related information found in the beacon and its own serial number, the PDK calculates the wakeup time to synchronize to the beacon and broadcast 820 an ALOHA response. As shown, the PDK's broadcasted ALOHA response may overlap several sensors causing multiple sensors to receive the information simultaneously. Each sensor that receives an ALOHA response from a PDK performs a store and forward 830 of the responses to the SMM 730 on a periodic basis.

The coordinator and sensors communicate to the SMM 730 via a backend network. This communications method used to attach each device to the SMM may be wired or wireless provided it has the bandwidth required to transport the information between the devices. When a PDK ALOHA response is detected by a sensor, the sensor collects information such as the PDK ID, receiver signal strength indication, and timestamp. After receiving this information from the sensors, the SMM independently applies the new information for each PDK from the sensors, to the previous history of that PDK and through location deterministic algorithms computes the most likely sensor microcell in which the PDK is located. There are multiple known algorithms for doing so. In one approach, location (proximity) is determined based on prior location history, time at the current location, RF signal strength and geographic contours. The SMM may also store the raw data for further alternate processing methods or for diagnostic purposes.

The SMM 730 can broadcast this information on the application layer messaging bus 740 for applications 720 to use. For example, one application 720A might be a location tracking application with a graphical user interface that shows the current position or trail of the PDK. The SMM 730 (or applications 720) may also store the location information and make it available on an on-demand basis.

In this particular example, access is allocated using a time division multiple access (TMDA) system, where an RF logical channel is distributed over time and each device has a specific period known as a timeslot in which they are allowed to respond. Each timeslot has a preamble and timeslot synchronization character followed by a packet, and lastly a guard period. The content of each packet is dependent on the source device, channel type (control or traffic), and timeslot location.

For example, the coordinator broadcasts the beacon on a period basis. All sensors and PDKs receive the beacon. Each PDK then broadcasts its ALOHA response at a specific timeslot allocated for that purpose. In addition to the handshake messages that occur on the control channel, the beacon and ALOHA response may also carry auxiliary data. This data may be in the form of an alarm indication, command/status, or user/application data, for example. It could be provided by an end application, SMM network command, external device interface (such as a terminal interface), or via an internal alarm functions such as low battery, input signal change, or setting an output signal polarity.

After an ALOHA response is broadcast from a PDK, the PDK listens for a command from nearby sensors. Based on the type of PDK and time it is present in one geographical location, one or more nearby sensors that detected the ALOHA response, may also send additional paging or auxiliary data in the sensor command response timeslot for a specific PDK.

Other timeslots can be allocated to traffic channels and/or to other messages over the control channel. Various TDMA approaches can be used to allocate the wireless communications channel. Non-TDMA approaches can also be used.

The sensor network system of FIG. 7 provides a closed loop system. With the SMM 730 being the central hub, broadcasting auxiliary data through the coordinator (and sometimes sensor devices) and collecting PDK auxiliary data through the sensors, it is possible to determine if in an asymmetrical system a command was successfully completed.

Figure 9:
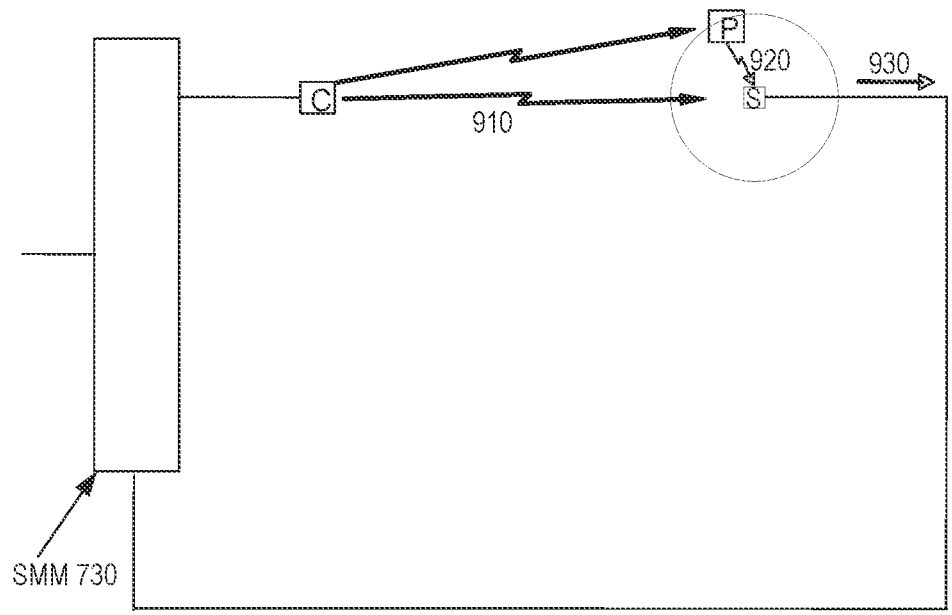

FIG. 9 illustrates an example of how the closed loop system works. In step 910, the SMM 730 (via the coordinator) broadcasts a beacon that also contains auxiliary information. This auxiliary information contains a command from an application 720 to be executed by the PDK. Assume that, for this particular command, the PDK is expected to acknowledge execution of the command. After the PDK executes the command, the PDK sends 920 the acknowledge message as auxiliary data in one of the PDK's ALOHA responses. The sensor receives the ALOHA response and passes 930 the information back to the SMM 730. The SMM 730 has now verified that the command was successfully executed. Such commands could be as simple as set an output to turn on a light or generate an audible sound. It is also possible that an application 720 attached to the SMM 730 may request to pass data to the specific PDK where that data may then be passed to an external terminal application where the system acts only as a transport mechanism. In this mode, the applications attached at each end would be responsible for verifying and acknowledging the data was sent and received successfully.

Figure 10:
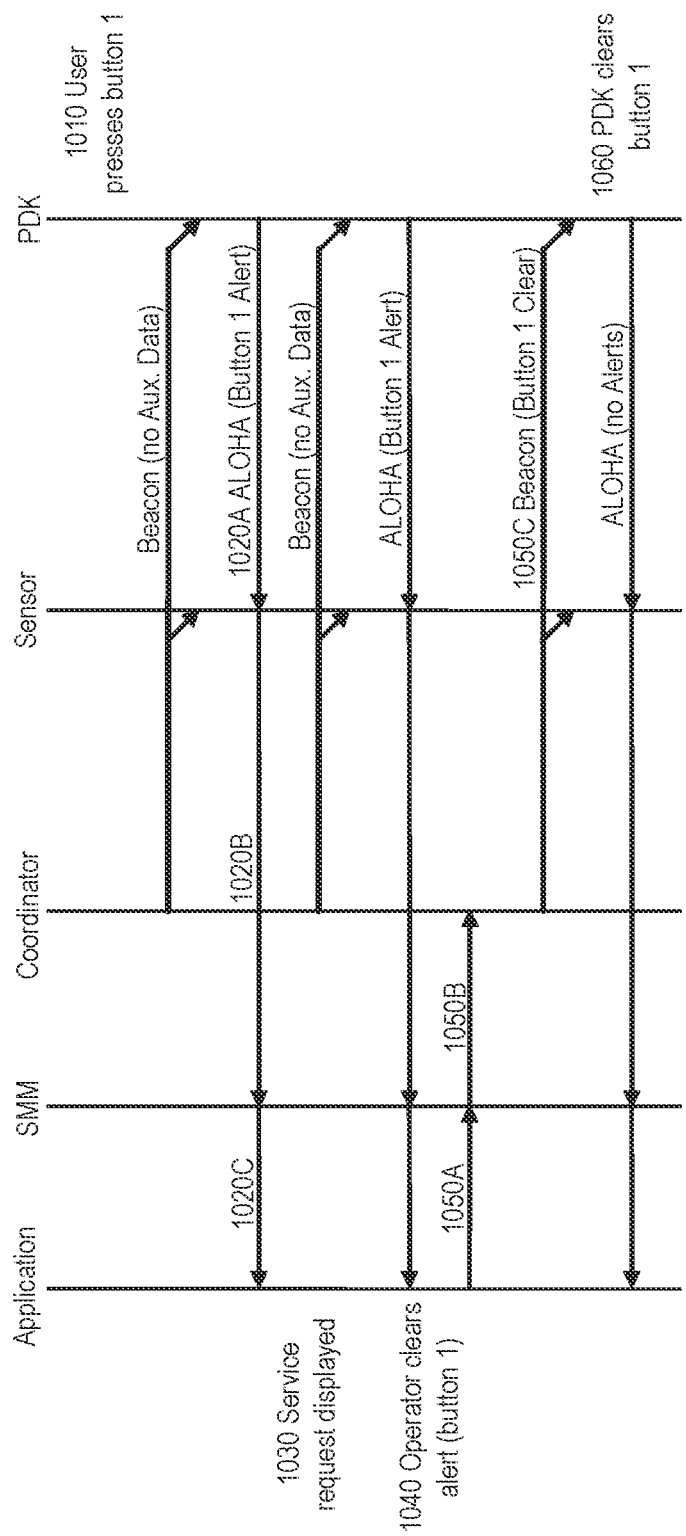
FIG. 10 is a diagram illustrating operation of the system in FIG. 7.

A second example is shown in FIG. 10, where the PDK initiates an alert. The coordinator periodically transmits a beacon and the PDK periodically returns an ALOHA response. In the example, a user carrying a PDK is located within a service oriented business, such as a department store, casino, restaurant, etc. The user desires to talk with a service representative from the organization and depresses 1010 the service button on their PDK (button 1). The next time the PDK wakes up to send an ALOHA response, the PDK attaches the button 1 alert to the ALOHA messages and broadcasts 1020A it. A local sensor receives the location response containing the button 1 alert and eventually sends 1020B the received ALOHA responses back to the SMM. The SMM may reformat the data and passes 1020C the indication back to the application. The application then indicates 1030 a button 1 request from the particular PDK serial number (and other related user information) on the application console. The PDK continues to send back the button 1 alert until cleared or a timeout period occurs. This allows devices that have inadequate coverage (e.g., on the edge of a cell boundary) to continue to send the alert until detected.

Eventually the console operator becomes aware of the service request and dispatches a representative to the user and clears 1040 the button 1 alert on the console. The clear button 1 alert is then sent 1050A-B to the coordinator where it is queued to go out 1050C on the proper beacon when the PDK will be awake. Once the PDK wakes up and receives 1050C its next beacon, the PDK clears out 1060 the button 1 alert indicator and returns to a basic ALOHA state with no auxiliary data pending.

The example shown may have also had a visible indicator in the PDK where the visible indicator may have become lit when the button was depressed. Once the button 1 alert was cleared the indicator would be unlit.

In this example, neither the application nor SMM verified the PDK actually received the clear button 1 alert. In one approach, each auxiliary message (page, alert, etc.) sent by a device contains a sequence number. If a device continues to send the information after it is acknowledged or cleared, the device is aware of the condition because of the sequence number. Any time a new auxiliary message is sent, the sequence number is incremented to alleviate the confusion as to how new or old any message is.

For some systems, redundancy is important. Redundancy can be implemented in the example system of FIG. 7 in a number of ways. For example, it is possible to provide multiple coordinators where these coordinators can be used to extend a coverage area or as a redundant backup. In one approach, each coordinator broadcasts its beacon on the same RF channel with a slight timing offset from the other coordinators. This creates a simulcast system where if one coordinator fails, the second coordinator can still resume system operation. This may also counter the issues of multipath by providing spatial diversity with the coordinators. Another redundancy measure is that information can be sent to PDK via the sensors, in addition to or in place of the coordinator. Another example of redundancy is that multiple sensor may receive messages from the PDK so there may be multiple paths back to the SMM via different sensors.

Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalent.

The invention claimed is:

1. A method comprising:
   detecting a personal digital key (PDK) associated with an asset within a proximity zone of a sensor device;
   responsive to the detecting, establishing a wireless communication channel between the sensor device and the PDK in the proximity zone of the sensor device by initiating a wireless transmission of an access key to the PDK, the access key being unique to an application and enabling the application to access the PDK via the sensor device;
   responsive to establishing the wireless communication channel, gathering position data about the asset using the PDK;
   generating location tracking data for the asset based on the position data; and
   providing the location tracking data for the asset to the application.

2. The method of claim 1, wherein initiating the wireless transmission of the access key to the PDK enables the application to gain access to a secure memory element of the PDK.

3. The method of claim 1, wherein gathering the position data about the asset using the PDK includes collecting a PDK identifier, a signal strength indication, and a timestamp.

4. The method of claim 1, wherein generating the location tracking data for the asset based on the position data includes:
   determining a prior location history of the PDK associated with the asset; and
   applying the position data and the prior location history of the PDK to a location deterministic algorithm.

5. The method of claim 1, further comprising:
responsive to establishing the wireless communication channel, initiating a wireless transmission of a command from the application to the PDK associated with the asset;
receiving an acknowledgement message of an execution of the command by the PDK; and
providing the acknowledgement message to the application.

6. The method of claim 5, wherein the command includes one from a group of turning on a light on the PDK and setting off an audible tone on the PDK.

7. The method of claim 5, wherein the execution of the command by the PDK is used to locate the asset in an indoor or outdoor site.

8. The method of claim 1, wherein the sensor device provides a data path between the PDK associated with the asset and the application.

9. The method of claim 1, wherein the application is a location tracking application.

10. The method of claim 9, wherein the location tracking application generates a graphical user interface to display a trail of the PDK associated with the asset.

11. A system comprising:
a sensor device and a memory including instructions that, when executed by the sensor device, cause the system to:
  detect a personal digital key (PDK) associated with an asset within a proximity zone of the sensor device;
  responsive to detecting the PDK, establish a wireless communication channel between the sensor device and the PDK in the proximity zone of the sensor device by initiating a wireless transmission of an access key to the PDK, the access key being unique to an application and enabling the application to access Ma the PDK via the sensor device;
  responsive to establishing the wireless communication channel, gather position data about the asset using the PDK;
  generate location tracking data for the asset based on the position data; and
  provide the location tracking data for the asset to the application.

12. The system of claim 11, wherein initiating the wireless transmission of the access key to the PDK enables the application to gain access to a secure memory element of the PDK.

13. The system of claim 11, wherein to gather the position data about the asset using the PDK, the instructions, when executed by the sensor device, further cause the system to collect a PDK identifier, a signal strength indication, and a timestamp.

14. The system of claim 11, wherein to generate the location tracking data for the asset based on the position data, the instructions, when executed by the sensor device, further cause the system to:
determine a prior location history of the PDK associated with the asset; and
apply the position data and the prior location history of the PDK to a location deterministic algorithm.

15. The system of claim 11, wherein the instructions, when executed by the sensor device, further cause the system to:
responsive to establishing the wireless communication channel, initiate a wireless transmission of a command from the application to the PDK associated with the asset;
receive an acknowledgement message of an execution of the command by the PDK; and
provide the acknowledgement message to the application.

16. The system of claim 15, wherein the command includes one from a group of turning on a light on the PDK and setting off an audible tone on the PDK.

17. The system of claim 15, wherein the execution of the command by the PDK is used to locate the asset in an indoor or outdoor site.

18. The system of claim 11, wherein the sensor device provides a data path between the PDK associated with the asset and the application.

19. The system of claim 11, wherein the application is a location tracking application.

20. The system of claim 19, wherein the location tracking application generates a graphical user interface to display a trail of the PDK associated with the asset.

* * * * *